United States Patent
Van Dam et al.

(10) Patent No.: US 6,508,988 B1
(45) Date of Patent: Jan. 21, 2003

(54) COMBINATORIAL SYNTHESIS SYSTEM

(75) Inventors: R. Michael Van Dam, Pasdena, CA (US); Marc A. Unger, South San Francisco, CA (US); Stephen R. Quake, San Marino, CA (US)

(73) Assignee: California Institute of Technology, Pasadena, CA (US)

(*) Notice: Subject to any disclaimer, the term of this patent is extended or adjusted under 35 U.S.C. 154(b) by 52 days.

(21) Appl. No.: 09/679,432

(22) Filed: Oct. 3, 2000

(51) Int. Cl.$^7$ ................................................ B01C 3/00
(52) U.S. Cl. ..................... 422/102; 422/68.1; 422/99; 422/100; 422/129; 422/130; 436/174; 436/180
(58) Field of Search .................. 422/68.1, 99, 100, 422/103; 436/174, 179, 180; 435/283.1, 287.8, 287.9, 288.3, 288.5; 204/193, 600

(56) References Cited

U.S. PATENT DOCUMENTS

| | | | |
|---|---|---|---|
| 5,376,252 A | * 12/1994 | Ekstrom et al. | 204/299 R |
| 5,681,484 A | * 10/1997 | Zanzucchi et al. | 216/2 |
| 5,858,188 A | * 1/1999 | Soane et al. | 204/454 |
| 5,866,345 A | * 2/1999 | Wilding et al. | 435/7.1 |
| 5,885,837 A | * 3/1999 | Winkler et al. | 435/91.1 |
| 5,942,443 A | * 8/1999 | Parce et al. | 436/514 |
| 6,186,660 B1 | * 2/2001 | Kopf-Sill | 366/340 |
| 6,261,431 B1 | * 7/2001 | Mathies et al. | 204/601 |
| 6,264,892 B1 | * 7/2001 | Kaltenbach et al. | 422/68.1 |

OTHER PUBLICATIONS

E. M. Southern et al., *Geonomics*, 1992, 13, 1008–1017.
Edwin M. Southern et al., *Journal of Biotechnology*, 1994, 35, 217–227.
G. Wallraff et al., *Chemtech*, 1997, 22–32.
R. Michael van Dam et al., *Genome Research*, 145–152.

\* cited by examiner

*Primary Examiner*—Jill Warden
*Assistant Examiner*—Dwayne K. Handy
(74) *Attorney, Agent, or Firm*—Townsend and Townsend and Crew LLP

(57) ABSTRACT

The present invention provides a chemical reaction apparatus for synthesizing an array of compounds and methods for using the same. In particular, the chemical reaction apparatus of the present invention comprises a solid support base, a first elastic member attached to the solid support base, and a first plurality of flow channels between the solid support base and the first elastic member. In addition, the solid support base comprises a functional group within at least a portion of the first plurality of flow channels for attaching compounds thereto. Optionally, the chemical reaction apparatus may further comprise a second plurality of flow channels which are in a different direction than the first plurality of flow channels. Moreover, the chemical reaction apparatus of the present invention can also include a second elastic member attached to the first elastic member. A plurality of pressure channels present in between the first and the second elastic members allows control of fluid flow within the first plurality of flow channels and/or the second plurality of flow channels.

39 Claims, 20 Drawing Sheets

| AAAA | ACAA | AGAA | ATAA | AAAC | ACAC | AGAC | ATAC | AAAG | ACAG | AGAG | ATAG | AAAT | ACAT | AGAT | ATAT |
|------|------|------|------|------|------|------|------|------|------|------|------|------|------|------|------|
| CAAA | CCAA | CGAA | CTAA | CAAC | CCAC | CGAC | CTAC | CAAG | CCAG | CGAG | CTAG | CAAT | CCAT | CGAT | CTAT |
| GAAA | GCAA | GGAA | GTAA | GAAC | GCAC | GGAC | GTAC | GAAG | GCAG | GGAG | GTAG | GAAT | GCAT | GGAT | GTAT |
| TAAA | TCAA | TGAA | TTAA | TAAC | TCAC | TGAC | TTAC | TAAG | TCAG | TGAG | TTAG | TAAT | TCAT | TGAT | TTAT |
| AACA | ACCA | AGCA | ATCA | AACC | ACCC | AGCC | ATCC | AACG | ACCG | AGCG | ATCG | AACT | ACCT | AGCT | ATCT |
| CACA | CCCA | CGCA | CTCA | CACC | CCCC | CGCC | CTCC | CACG | CCCG | CGCG | CTCG | CACT | CCCT | CGCT | CTCT |
| GACA | GCCA | GGCA | GTCA | GACC | GCCC | GGCC | GTCC | GACG | GCCG | GGCG | GTCG | GACT | GCCT | GGCT | GTCT |
| TACA | TCCA | TGCA | TTCA | TACC | TCCC | TGCC | TTCC | TACG | TCCG | TGCG | TTCG | TACT | TCCT | TGCT | TTCT |
| AAGA | ACGA | AGGA | ATGA | AAGC | ACGC | AGGC | ATGC | AAGG | ACGG | AGGG | ATGG | AAGT | ACGT | AGGT | ATGT |
| CAGA | CCGA | CGGA | CTGA | CAGC | CCGC | CGGC | CTGC | CAGG | CCGG | CGGG | CTGG | CAGT | CCGT | CGGT | CTGT |
| GAGA | GCGA | GGGA | GTGA | GAGC | GCGC | GGGC | GTGC | GAGG | GCGG | GGGG | GTGG | GAGT | GCGT | GGGT | GTGT |
| TAGA | TCGA | TGGA | TTGA | TAGC | TCGC | TGGC | TTGC | TAGG | TCGG | TGGG | TTGG | TAGT | TCGT | TGGT | TTGT |
| AATA | ACTA | AGTA | ATTA | AATC | ACTC | AGTC | ATTC | AATG | ACTG | AGTG | ATTG | AATT | ACTT | AGTT | ATTT |
| CATA | CCTA | CGTA | CTTA | CATC | CCTC | CGTC | CTTC | CATG | CCTG | CGTG | CTTG | CATT | CCTT | CGTT | CTTT |
| GATA | GCTA | GGTA | GTTA | GATC | GCTC | GGTC | GTTC | GATG | GCTG | GGTG | GTTG | GATT | GCTT | GGTT | GTTT |
| TATA | TCTA | TGTA | TTTA | TATC | TCTC | TGTC | TTTC | TATG | TCTG | TGTG | TTTG | TATT | TCTT | TGTT | TTTT |

COMBINATORIAL SYNTHESIS SYSTEM

STATEMENT REGARDING FEDERALLY SPONSORED RESEARCH

The U.S. Government has a paid-up license in this invention and the right in limited circumstances to require the patent owner to license others on reasonable terms as provided for by the terms of Grant No. HG-01642-02, awarded by the National Institute of Health.

FIELD OF THE INVENTION

The present invention relates to a chemical reaction apparatus for synthesizing an array of compounds. In particular, the present invention relates to a microfluidic chemical reaction apparatus for a combinatorial synthesis.

BACKGROUND OF THE INVENTION

Methods for synthesizing polymers (e.g., oligonucleotides) on a solid support have been developed for producing large arrays of polymer sequences on solid substrates. These large "arrays" of polymer sequences have wide ranging applications and are of substantial importance to many industries including, but not limited to, the pharmaceutical, biotechnology and medical industries. For example, the arrays can be used in screening large numbers of molecules for biological activity, e.g., receptor binding capability. And arrays of oligonucleotide probes can be used to identify mutations in known sequences, as well as in methods for de novo sequencing of target nucleic acids. In addition, PNA (peptide nucleic acids) arrays can be used to screen molecules which are useful in antisense (mRNA) gene regulation, or molecules which bind to specific sequences of double-stranded DNA.

Oligonucleotide arrays with up to tens of thousands of samples on an area of a few square centimeters have been synthesized and proven to be extraordinarily useful in various applications including gene expression studies. Over the past several years, a new set of technologies have emerged for making arrays of synthetic surface-bound polymers.

One of the most successful methods of synthesizing high-density patterns on surfaces is photolithography as discussed in U.S. Pat. No. 5,143,854, issued to Pirrung et al., and PCT Application No. 92/10092. In this method, light is directed to selected regions of a substrate to remove protecting groups from the selected regions of the substrate. Thereafter, selected molecules are coupled to the substrate, followed by additional irradiation and coupling steps. By activating selected regions of the substrate and coupling selected monomers in precise order, one can synthesize an array of molecules having any number of different sequences, where each different sequence is in a distinct, known location on the surface of the substrate. This method requires specialized reagents (e.g., photoremovable protecting groups), which presently have significantly lower coupling yield than conventional reagents. Moreover, in general, to make an array of N-mers requires 4N cycles of deprotection and coupling, one for each of the 4 bases, times N base positions. This photolithographic method also typically requires 4N masks, thereby adding a considerable expense to the procedure.

Another method for producing polymer arrays is an ink-jet technique which uses the print heads of commercial piezoelectric ink-jet printers to deliver reagents to individual spots on the array. While this technique uses relatively inexpensive conventional chemical reagents with typically high coupling yield, it can deliver one, and only one, drop of reagents at a time, unless multiple jets are used simultaneously. Moreover, the solid support must be patterned to achieve small feature sizes. Furthermore, two drops of liquid applied too closely together on a surface tend to spread into each other and mix, thereby limiting the array density achievable with the ink-jet method.

There are other methods including robotic deposition of reagents in an array of fluid-containing wells and the use of fluidics to deposit reagents on a surface. See for example, U.S. Pat. No. 6,001,311, issued to Brennan et al. and U.S. Pat. No. 6,121,048, issued to Zaffaroni et al. However, each method has its own limitations such as limited array density, increased production cost per array, and/or serial (i.e., non-parallel) synthesis.

Therefore, there is a need for a chemical reaction apparatus and a method for preparing array of compounds with high throughput, high product quality, enhanced miniaturization and lower costs.

SUMMARY OF THE INVENTION

The present invention provides a chemical reaction apparatus capable of synthesizing an array of compounds.. ,Preferably, the chemical reaction apparatus is a microfluidic system. In one aspect, the present invention provides a chemical reaction apparatus having on/off valves (i.e., switching valves) made out of one or more elastomers. The chemical reaction apparatuses of the present invention are ideally suited for controlling, channeling, and/or directing fluid movement to allow combinatorial synthesis of an array of compounds on a solid support.

In one embodiment, the chemical reaction apparatus of the present invention comprises a solid support base and a first elastomer layer interconnected, i.e., attached thereto. In addition, there is a first plurality of flow channels in between the interface of the solid support base and the first elastic member. In this manner, a solvent, a solution or a reagent can be introduced through the first flow channels to either remove the reagent(s) or to introduce the reagent(s). Moreover, at least a portion of the solid support base within the first flow channels comprises a functional group. This functional group allows one to attach a first group of compound(s) to the solid support base for a subsequent combinatorial synthesis of an array of compounds.

The first elastomer layer may be removably attached to the solid support base. Thus, after a first set of compounds are introduced into a selected plurality of flow channels to attach at least a portion of the compounds on to the solid support base by bonding to the functional groups, the unattached (i.e., non-reacted or non-bonded) compounds are removed from the first flow channels, e.g., by rinsing the plurality of flow channels with a solvent. The elastic member is then removed from the solid support base and reattached to the solid support base such that the first flow channels are oriented at an angle to the previous first flow channel direction, preferably at an angle substantially perpendicular to the previous first flow channel direction. A second set of compounds are then introduced through a selected plurality of flow channels, and again the unattached compounds are removed from the flow channels. The removal and reattachment of elastomer layer and introduction of a set of compounds are repeated until a desired array of compounds are synthesized on a selected portion of the solid support base.

Alternatively, the chemical reaction apparatus of the present invention can have a second plurality of flow channels, which intersect the first plurality of flow channels, preferably at a right angle, i.e., the first plurality of flow channels are perpendicular to the second plurality of flow channels. By selectively closing off either the first or the second plurality of flow channels (or portions thereof), and introducing a set of compounds to the open flow channels, one can prepare an array of compounds on selected portions of the solid support base. Preferably, the array of compounds are synthesized on or near the intersections of the first plurality of flow channels and the second plurality of flow channels. This method provides a variety of advantages including, among others, (1) synthesis of polymers without the need for removal and precise realigning of the first elastic member, and (2) elimination of exposure of growing polymers to air or other contaminants.

In another embodiment of the present invention, one or more additional elastomer layers are attached on top of the first elastomer layer such that recesses (i.e., a plurality of pressure channels) are formed in between each of the various elastomer layers. These pressure channels act as valves by selectively closing a particular flow channel(s) when the appropriate pressure channels are pressurized. In one particular embodiment of the present invention, as illustrated in FIG. 12, at least a portion of the pressure channels (i.e., adjacent pressure channels) are situated (i.e., aligned) in between the first flow channels. In this manner, when pressure is applied to the adjacent pressure channels, at least a portion of the second plurality of flow channels are closed while the plurality of first flow channels remain open. This allows selective addition of reagents into the first plurality of flow channels.

Furthermore, the chemical reaction apparatus of the present invention can also have a plurality of pressure channels (i.e., top-aligned pressure channels) which are situated on a portion, preferably on top, of the first flow channels. In this manner, when pressure is applied to the top-aligned pressure channels, at least a portion of the first plurality of flow channel are closed while leaving the second plurality of flow channels open. Typically, the portions which are open and closed are dependent upon the diameter of the overlying pressure channel.

One of the major advantages of having both top-aligned and adjacent-aligned pressure channels is that by appropriately designing the pressure channels only one additional elastomer layer (i.e., the second elastomer layer) is needed to control all the flow channels.

The elastomer layers can be interconnected by any of the variety of known methods, including bonding together two separate layers with each layer being separately manufactured, e.g., by casting from a micro-machined mold. In one particular embodiment of the present invention,.each layer of the elastic member is separately cured before one elastic member is positioned on top of the other elastic member. The two elastic members are then bonded together, e.g., by using an adhesive or when each elastic member comprises an excess of different component of a two-component curing material, the two elastic member layer can be cured to provide a single elastic piece. In the latter method, each elastic member preferably has an excess of one of the two components or a deficiency of one of the components, such that reactive molecules remain at the interface between the layers. One of the elastic members is assembled on top of the other elastic member and heated or exposed to UV light, for example, to bond one elastic member to the other. The two layers bond irreversibly such that the strength of the interface substantially equals the strength of the bulk elastomer. This creates a single three-dimensional patterned structure from the original two elastic members. Additional elastic layers can be added by simply repeating the process, where new elastic layers, each having an opposite "polarity" are cured, and thereby bonded together.

A further advantage of either above embodiment of the present invention is that due to its integral nature, (i.e., all the elastic members are composed of the same material) the inter layer adhesion failures and thermal stress problems are reduced or completely avoided.

In various aspects of the invention, a plurality of pressure channels pass through the elastic member structure with the pressure channels extending across and above the flow channels. In this aspect of the invention, a thin layer of elastomer separates the pressure channels and the flow channels. As explained in detail below, downward movement of this thin elastomer layer (e.g., due to the pressure channels being pressurized or the thin elastomer layer being otherwise actuated) will cut off flow passing through the flow channels.

In other optional preferred aspects, magnetic or conductive materials can be added to make layers of the elastomer magnetic or electrically conducting, thus enabling the downward movement of the thin elastomer layer using an applied voltage or a magnetic field.

The present invention also provides methods for preparing arrays of polymer sequences wherein each array includes a plurality of different, positionally distinct polymer sequences having known monomer sequences. In one embodiment, the solid support base includes a functional group within at least a portion of the first plurality of flow channels for attaching compounds thereto. While the solid support base need not naturally contain this functional group, it should be appreciated that the solid support base should readily be able to be derivatized to provide appropriate functional groups on the surface for derivatization. Polymer sequences are then synthesized on the surface of the solid support base by selectively exposing a plurality of selected regions on the surface with a monomer, preferably as a solution in a solvent, to couple monomers to the surface in the selected regions. By pressurizing certain pressure channels, one can prevent certain portions of the solid support base from being contacted with a monomer, i.e., one can selectively close off desired flow channels by pressurizing the appropriate pressure channels. The closing of portions of flow channels and contacting the remaining flow channels can be repeated until a plurality of polymer arrays are formed on the surface of the solid support base. Each polymer array includes a plurality of different polymer sequences coupled to the surface of the solid support base in a different known location.

In a further embodiment, the present invention provides a method of synthesizing polymers on solid support bases by first derivatizing the solid support base with a linker. Such linkers are well known to one of ordinary skill in the art and include compounds of the formulas Q—R—SH and QRSi(OR)$_x$R$_y$X$_z$, where Q comprises a moiety of the formula: —SH, —CH(O)CH$_2$, —NR$_2$, —NR'—(CH$_2$)$_n$—NR$_2$;

each of R' and R is independently hydrogen or an alkyl group;

X is a halide; and each of x, y, and z is independently an integer from 0 to 3, provided the sum of x, y, and z is 3.

Particular exemplary linkers include aminoalkyltrialkoxysilanes, and those disclosed below.

BRIEF DESCRIPTION OF THE DRAWINGS

FIGS. 19A–D are illustrations of respective nucleotides added to chemical reaction apparatus of the present invention after each step in Example 2.

DETAILED DESCRIPTION OF THE PRESENT INVENTION

Figure 1:
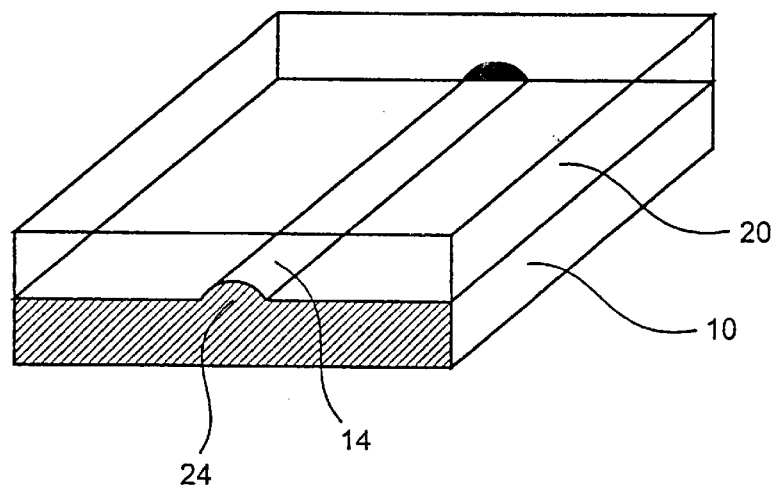
FIG. 1 is an illustration of a first elastic member formed on top of a mold having a protrusion along one direction.

The terms "flow channel" and "solid support base-elastomer interface channel" are used interchangeably herein and refer to a channel or a space which is present between the solid support base and the elastomer which is attached to the solid support base. The flow channel is preferably formed as a result of a recess which is present in the elastomer, e.g., by sandwiching an elastomer containing channels (e.g., depressions) in its surface against a flat solid support base, or sandwiching a flat elastomer against a solid support base containing channels, or sandwiching an elastomer containing channels against a solid support base containing channels.

The terms "elastomer," "elastomer layer" and "elastic member" are used interchangeably herein and generally refer to a layer of elastic polymer which is present in the chemical reaction apparatus of the present invention. However, it should be appreciated that for a chemical reaction apparatus having only one elastic member, there is no need for the "elastic member" to be pliable. Thus, for such apparatus the elastic member can include non-elastic polymers and glass.

The term "integrated elastomer structure" or "integrated elastomer device" refers to one or more elastomer layers which have been permanently bonded together to form a chemical reaction apparatus.

The terms "pressure channel," "elastic member interface channel" and "elastomer interface channel" are used interchangeably herein and refer to a channel or a space which is present between two elastomer layers or a channel or a space which is completely surrounded by an elastomer. Pressure channels are preferably formed by sandwiching two elastomers where one or both elastomers contain depressions in their surface.

The term "top-aligned pressure channel" or "above-aligned pressure channel" refers to a pressure channel which is in the same direction as the first flow channels and which is situated on top of a first flow channel when viewed from the top of the chemical reaction apparatus, i.e., viewed perpendicular to the solid support base's surface.

The term "adjacent pressure channel" refers to a pressure channel which is in the same direction as the first flow channels and which is situated adjacent to a first channel or in between two first channels when viewed from the top of the chemical reaction apparatus, i.e., viewed perpendicular to the solid support base's surface.

The term "array" refers to a preselected collection of different polymer sequences or probes which are associated with a surface of a solid support base. An array may include polymers of a given length having all possible monomer sequences made up of a specific basis set of monomers, or a specific subset of such an array. For example, an array of all possible oligonucleotides of length 8 includes 65,536 different sequences. However, an array may include only a subset of the complete set of monomers. Similarly, a given array may exist on more than one separate solid support base, e.g., where the number of sequences necessitates a larger surface area in order to include all of the desired polymer sequences.

The term "monomer" and "building block" are used interchangeably herein and refer to a member of the set of smaller molecules which can be joined together to form a larger molecule or polymer. Exemplary monomers include, but are not limited to, natural or synthetic amino acids (including common L-amino acids and D-amino acids), nucleotides (including PNA, and natural and unnatural ribonucleotides and deoxyribonucleotides) and polysaccharides (including pentoses and hexoses). As used herein, monomer refers to any member of a basis set for synthesis of a larger molecule. A selected set of monomers forms a basis set of monomers. For example, the basis set of nucleotides includes A, T (or U), G and C. In another example, dimers of the 20 naturally occurring L-amino acids form a basis set of 400 monomers for synthesis of polypeptides. Different basis sets of monomers may be used in any of the successive steps in the synthesis of a polymer. Furthermore, each of the sets may include protected members which are modified after synthesis. It should be appreciated that the monomer units, while not necessary, are often protected in such a way that only one monomer unit is added at a time. When the monomer units contain a protecting group, a deblocking reaction is then needed to remove the protecting group before adding the next monomer unit, for example, in non-array DNA and peptide synthesis.

The present invention comprises a variety of chemical reaction apparatus comprising an elastic member attached to a solid support base (i.e., solid support), and methods for using the same to synthesize compounds, preferably an array of compounds. The interface between the elastic member and the solid support has a first plurality of channels (i.e., first flow channels). Methods of fabricating the chemical reaction apparatus of the present invention are generally discussed in the commonly assigned co-pending patent application entitled "Microfabricated Elastomeric Valve and Pump Systems," filed on Jun. 27, 2000, which is incorporated herein by reference in its entirety. Preferably, the chemical reaction apparatuses of the present invention are microfluidic devices or apparatuses which allows a small scale combinatorial synthesis.

It is to be understood that the present invention is not limited to fabrication of a chemical reaction apparatus in the manner discussed below. Rather, other suitable methods of fabricating the present chemical reaction apparatus, including modifying the present methods, are also contemplated.

In the first exemplary method of producing the chemical reaction apparatus, as shown in FIG. 1, a first micro-machined mold 10 is provided. Micro-machined mold 10 may be fabricated by a number of conventional silicon processing methods, including but not limited to photolithography, ion-milling, and electron beam lithography. For example, micromachined mold 10 may be patterned photoresist on silicon wafers. Alternatively, the mold 10 is fabricated by etching a silicon wafer. (e.g., by wet-etching processes) to provide protrusions that are made of silicon. Still for some materials and coatings, it may be necessary to make the mold out of RTV, polyurethane, or the like.

Micro-machined mold 10 has a first plurality of raised lines or protrusions 14 extending therealong (only one protrusion 14 is shown for clarity in FIG. 1). A first elastic member 20 is cast on top of mold 10 such that a first recess 24 is formed in the bottom surface of the first elastic member 20, (recess 24 corresponding in dimension to protrusion 14), as shown.

Figure 2:
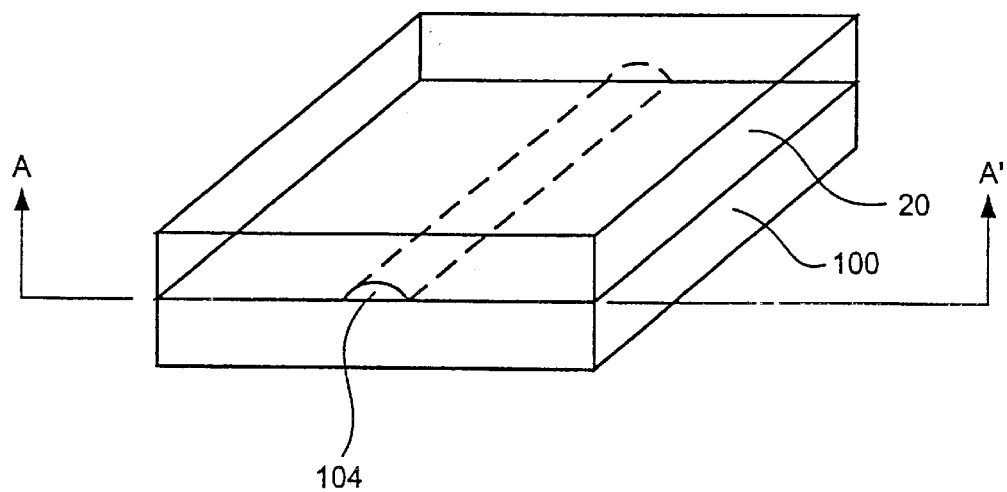
FIG. 2 is an illustration of the first elastic member of FIG. 1 removed from the mold and positioned on top of the solid support, thereby forming a flow channel.
Figure 3:
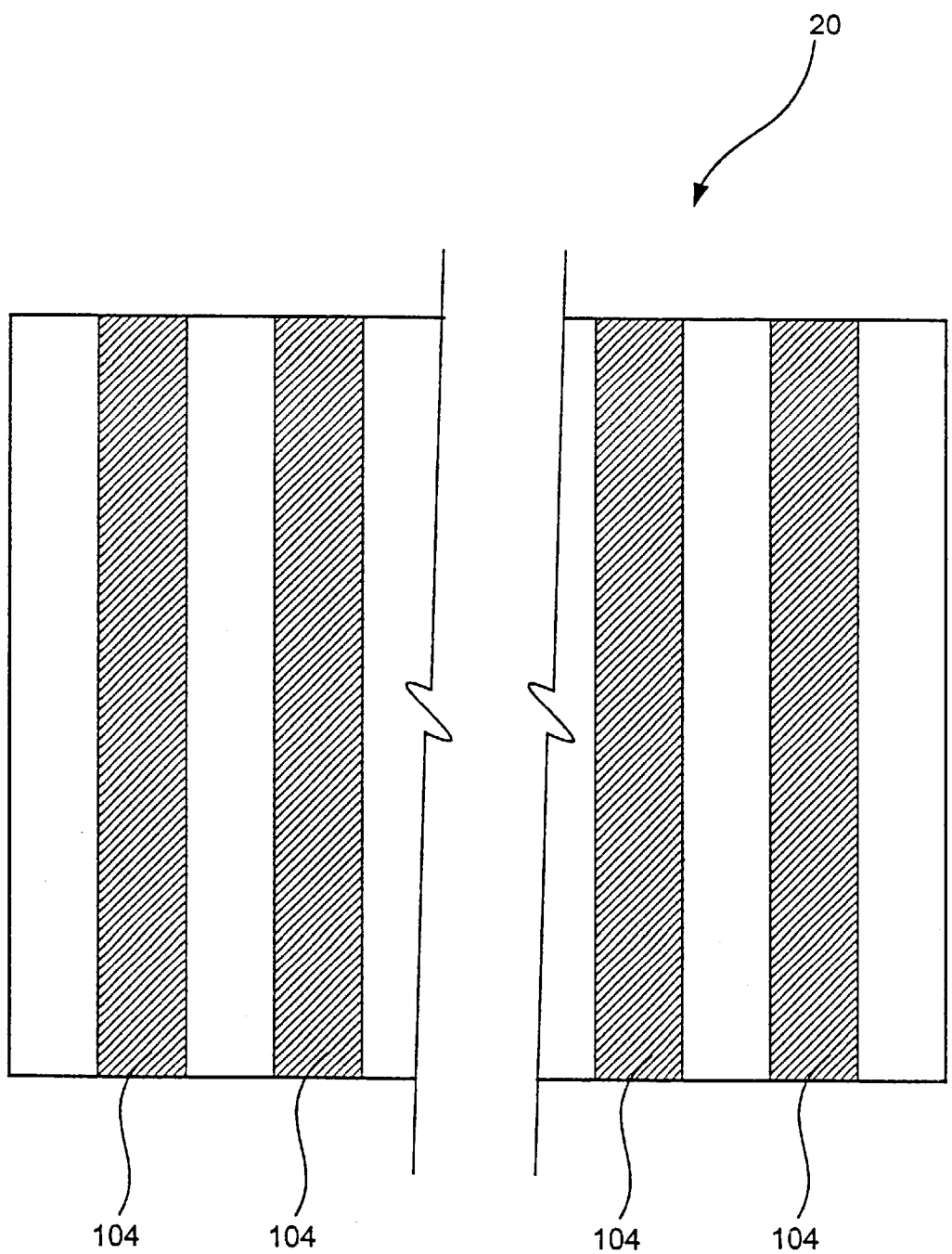
FIG. 3 is a bottom view illustration of a first elastic member having a plurality of recesses for forming flow channels.

In one embodiment of the present invention, this first elastic member 20 having a plurality of recesses 24 (see FIG. 1) is placed on top of a solid support base 100. As can be seen in FIG. 2, when the first elastic member 20 has been sealed at its bottom surface to the solid support base 100, recess 24 forms a flow channel 104. As shown in FIG. 3, which is a cut away view in the direction of A–A', the first elastic member 20 comprises a plurality of recesses 24 which when attached to the solid support base 100, forms a first plurality of flow channels 104.

Figure 4A:
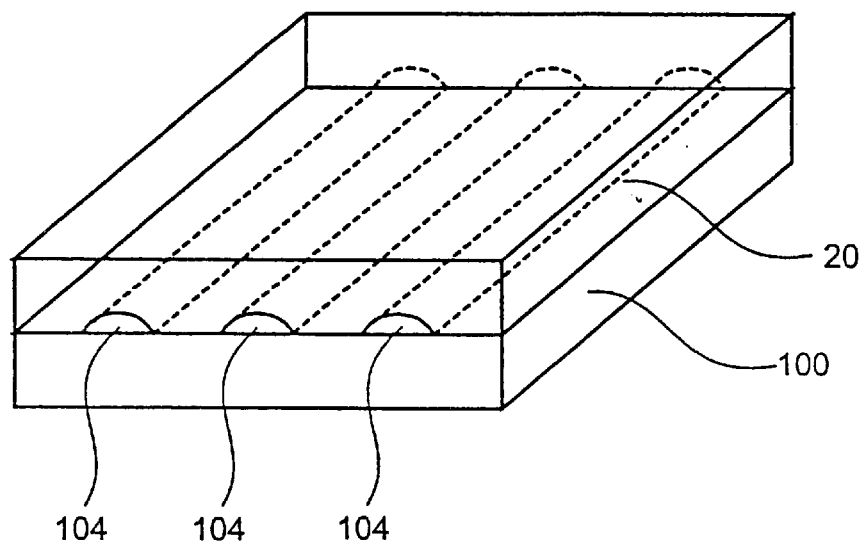
FIG. 4A depicts a single elastic member layer chemical reaction apparatus with an illustration of a first elastic member, similar to one shown in FIG. 3, positioned on top of the solid support, thereby forming a first plurality of flow channels.
Figure 4B:
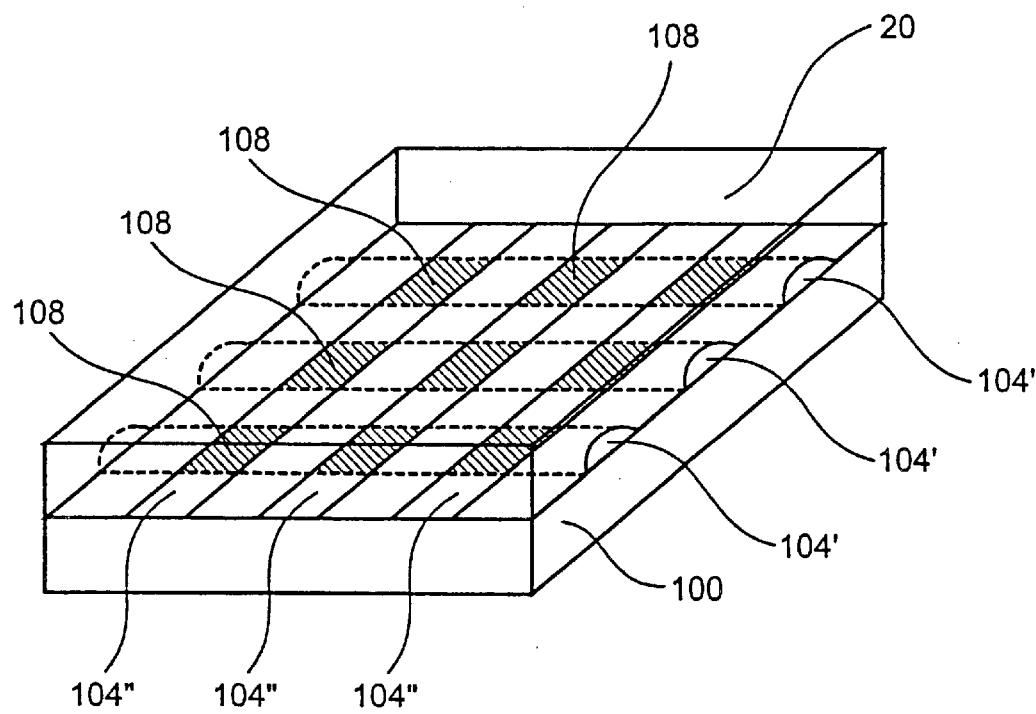
FIG. 4B is an illustration of the first elastic member on top of the solid support base, where the first elastic member has been removed and repositioned on top of the solid support base after 90° rotation.

In one aspect of the present invention, the first elastic member 20 having a first plurality of flow channels 104 is removably attached to the solid support base 100, as shown in FIG. 4A. In one embodiment, the first elastic member 20 forms a reversible hermetic seal, which may be enhanced by compression, with nearly any smooth planar solid support base. An advantage to forming a seal this way is that the elastic member 20 may be peeled up (i.e., removed from the solid support base), washed, re-used, and/or repositioned. Thus, in one method of combinatorial synthesis, a first set of compounds (i.e., monomers) are added to the chemical reaction apparatus through the desired first plurality of flow channels 104. It should be appreciated that not all of the flow channels 104 need to be injected with a monomer. Monomers which are unreacted or unattached to the solid support base 100 are then removed by rinsing the flow channels 104 with a solvent. The first elastic member 20 is then removed from the solid support base 100 and is reattached to the solid support base 100, as shown in FIG. 4B, such that the first plurality of flow channels 104' now intersect (e.g., are perpendicular to) the previous position of the first plurality of channels 104". Another set of monomers are then added to the chemical reaction apparatus through the first plurality of flow channels 104' such that they react with the first monomers (or the functional group present in the solid support base) which are attached to the solid support base 100 at intersections 108. Again the excess monomers are removed by rinsing the first plurality of flow channels with a solvent. The first elastic member 20 is once again removed from the solid support base 100 and reattached in the "original" configuration as shown in FIG. 4A. The process is repeated until a desired array of compounds are produced.

To aid in alignment of the first elastic member 20 to the solid support base 100, an alignment guide (not shown) may be present on the first elastic member 20 or the solid support base 100, or both. The alignment guide may be as simple as marking(s) present on the first elastic member 20 and/or the solid support base 100. Or the alignment guide can be one or more joints, e.g., having a male part on the first elastic member 20 and the female part on the solid support base 100, or vice versa. A joint can be as simple as a combination of depression(s) and :protrusion(s), which fit snugly against one another. Alternatively, the alignment guide can be a pin and hole (i.e., pin and socket) mechanism.

Figure 5:
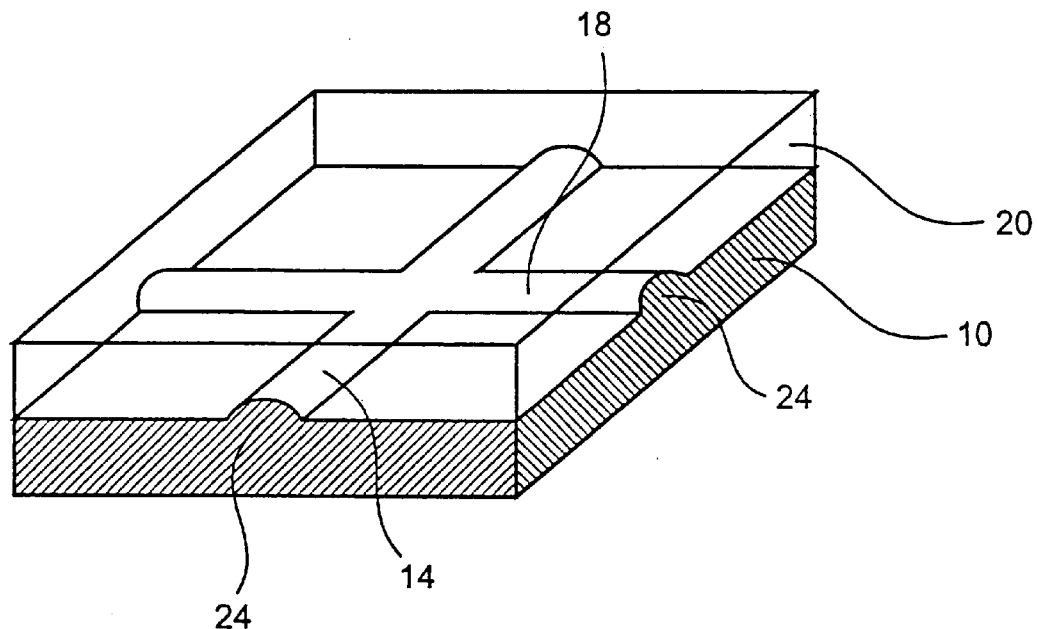
FIG. 5 is an illustration of a first elastic member formed on top of a mold having protrusions along two different perpendicular directions.

Another embodiment of producing the chemical reaction apparatus is shown in FIG. 5. In this embodiment, a first micro-machined mold 10 has a first plurality of raised lines or protrusions 14 extending therealong (only one protrusion 14 is shown for clarity). In addition, the micro-machined mold 10 has a second plurality of raised lines or protrusions 18 (again only one protrusion 18 is shown for clarity). A first elastic member 20 is cast on top of mold 10 such that a first plurality of recesses 24 and a second plurality of recesses 28 are formed in the bottom surface of the first elastic member 20, (recesses 24 and 28 corresponding in dimension to protrusions 14 and 18, respectively), as shown.

Figure 6:
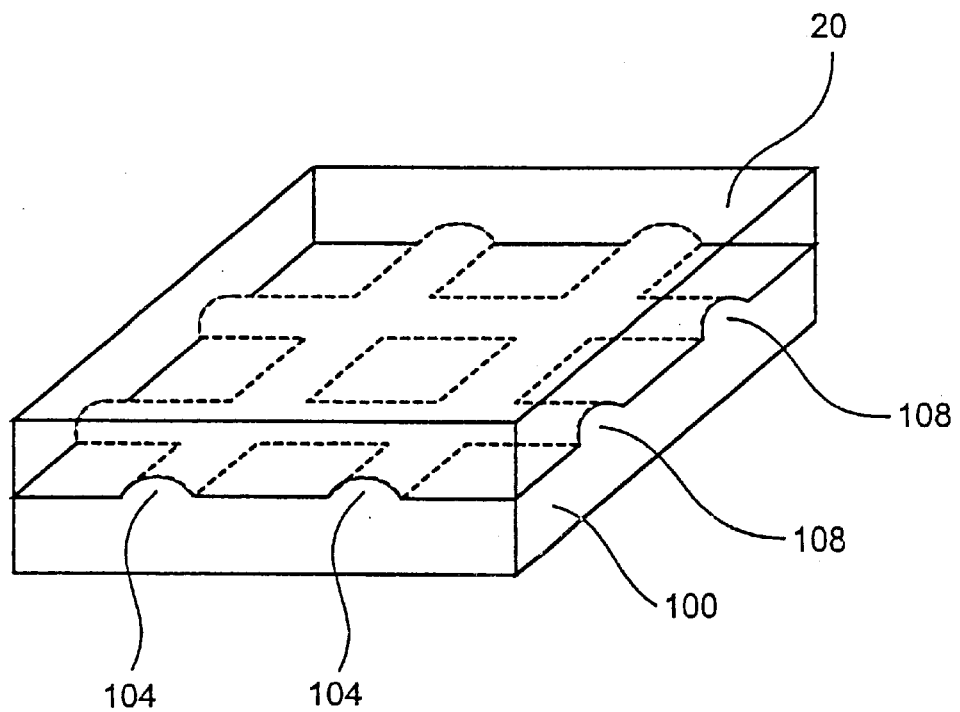
FIG. 6 is an illustration of a first elastic member, similar to one shown in FIG. 5, positioned on top of the solid support, thereby forming a first plurality of flow channels and a second plurality of flow channels.
Figure 7:
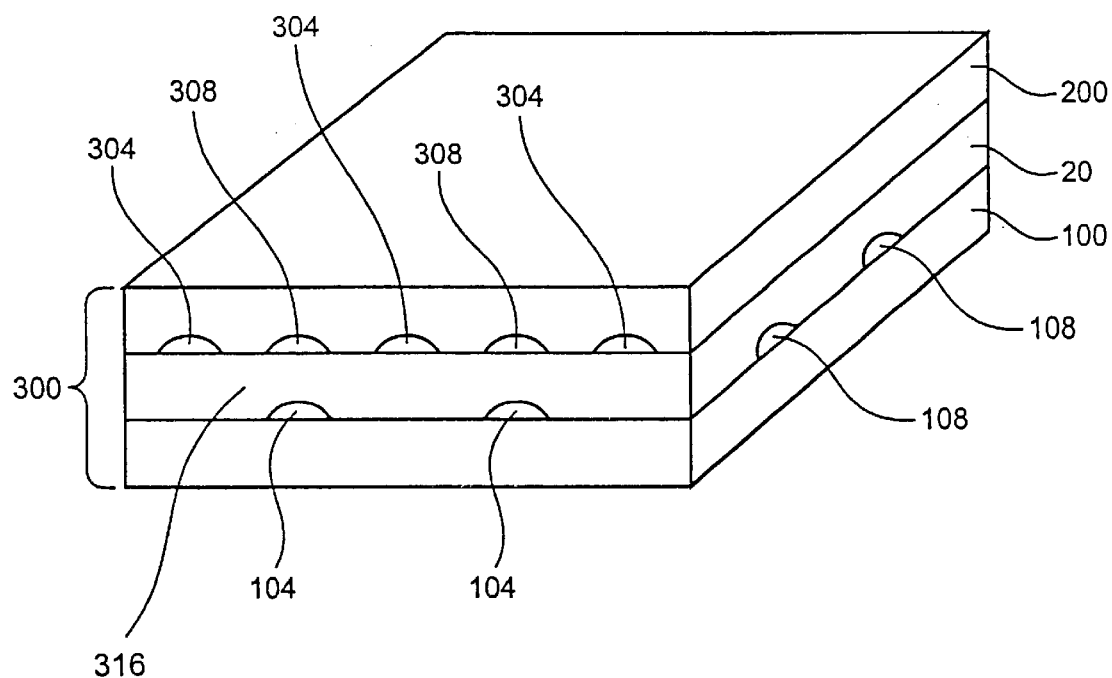
FIG. 7 is an illustration of a chemical reaction apparatus comprising a solid support, a first elastic member attached to the solid support with a first and a second plurality of flow channels, and a second elastic member attached to the first elastic member with a plurality of pressure channels in between the first and the second elastic members.

As shown in FIGS. 6 and 7, the first elastic member 20 having a plurality of recesses 24 and 28 (see FIG. 5) is then placed on top of a solid support base 100. As can be seen in FIG. 6, when the first elastic member 20 has been sealed at its bottom surface to the solid support base 100, recesses 24 and 28 forms a first plurality of flow channels 104 and a second plurality of flow channels 108, respectively. A second elastic member 200 is then placed on top of the first elastic member 20 to form a two-layer elastomer structure 300. The separate first and second elastic members 20 and 200, respectively, are bonded together to form an integrated elastomeric structure 300. The second elastic member 200 has a plurality of pressure channels including adjacent pressure channels 304 and top-aligned pressure channels 308, which act as on/off or control valves, as discussed in detail below, for at least a portion of the flow channels 104 and 108, respectively. It should be appreciated that, while FIG. 7 only shows one adjacent pressure channel 304 between two first flow channels 104, there can be present two or more adjacent pressure channels 304 between two first flow channels 104, as described in detail below.

One aspect of the present invention for producing the chemical reaction apparatus involves using pre-cured elastic members which are then assembled and bonded. Another embodiment involves curing each layer of elastomer "in place".

Figure 8A:
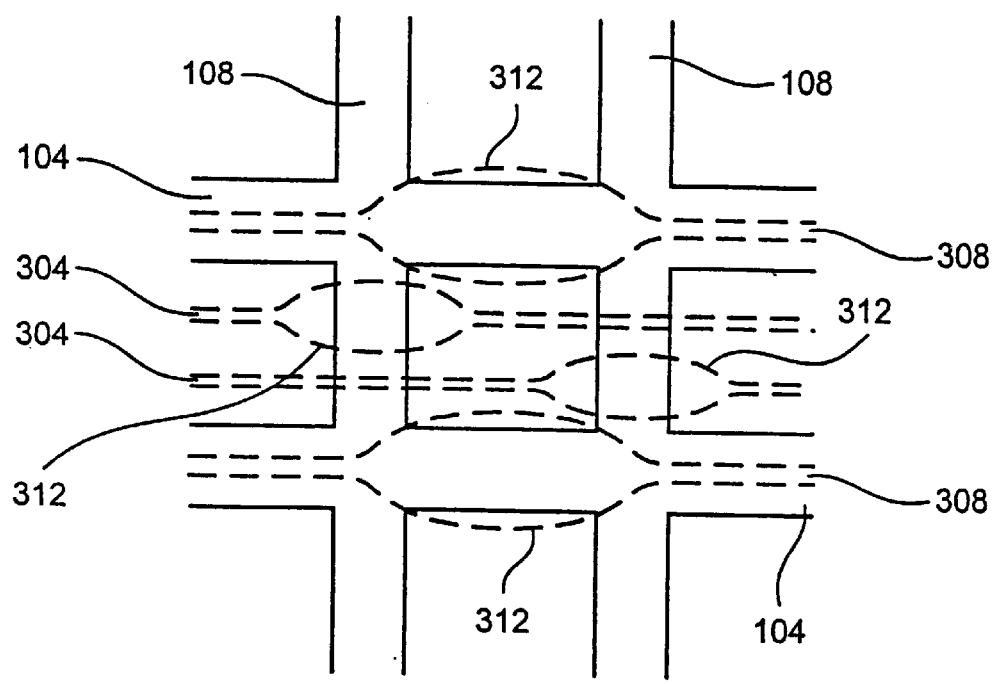
FIG. 8A is a schematic illustration of a chemical reaction apparatus having multiple pressure channels to permit flow control of individual flow channels.
Figure 8B:
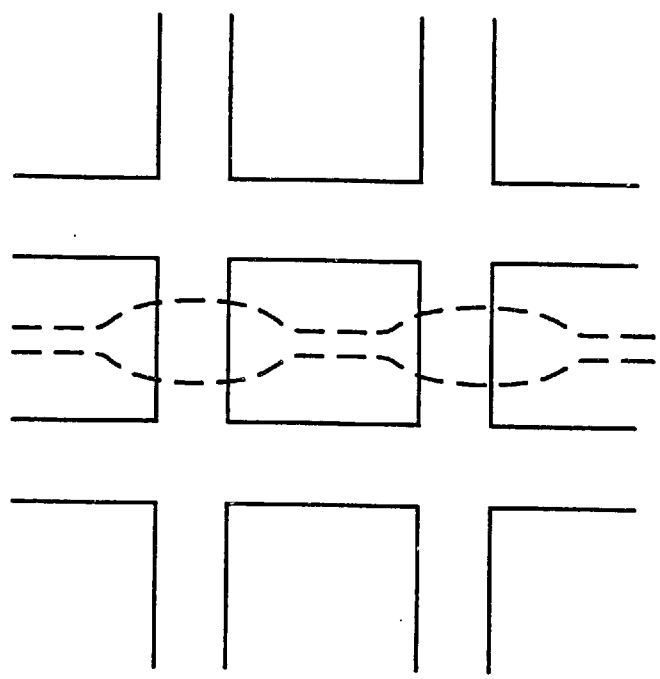
FIG. 8B is a schematic illustration of a pressure channel capable of controlling two flow channels simultaneously.

FIGS. 8 and 8A are a schematic illustration of elastomer structure 300 showing only the flow channels (104 and 108) and pressure channels (304 and 308). The pressure channels 304 and 308 have different widths within each pressure channel. In this manner, when one or more of these pressure channels is pressurized, the large width portion 312 expands and closes off the flow channel 104 and/or 108 which is directly underneath the large width portion of the pressure channel 304 and/or 308. The adjacent pressure channel 304 can control multiple flow channels by having more than one large width portions 312, as shown in FIG. 8A.

Preferably, the solid support base 14 is glass, quartz, polystyrene or another silicone rubber, and more preferably glass. These solid support bases are transparent, and therefore allow optical interrogation of the flow channels. Another advantage of using glass as the solid support base is that it is inert to most solvents, and its smooth surface allows good sealing with the first elastic member. Alternatively, the elastomeric structure may be bonded onto a flat elastomer layer (e.g., silicone rubber) by the same method as described above, forming a permanent and high-strength bond. This may prove advantageous when higher back pressures are used.

Figure 9A:
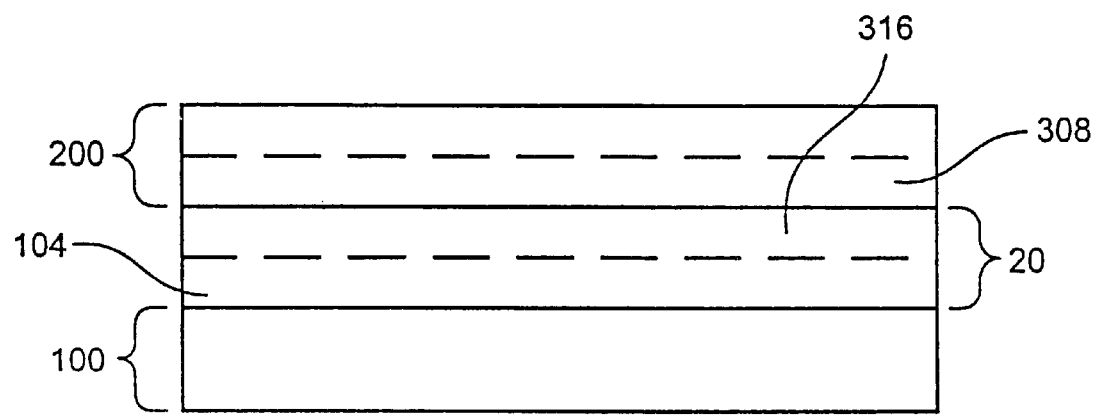
FIG. 9A is a sectional elevation view of a chemical reaction apparatus of the present invention having a solid support, a first elastic member, and a second elastic member.
Figure 9B:
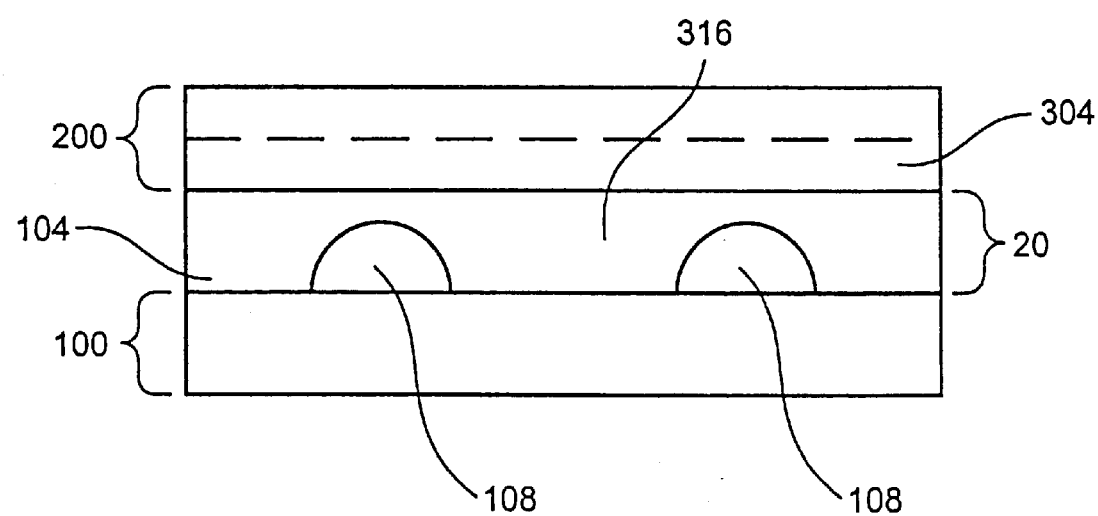
FIG. 9B is also a sectional elevation view of a chemical reaction apparatus of the present invention having a solid support, a first elastic member, and a second elastic member.

As can be seen in FIGS. 9A and 9B, the flow channels 104 and 108, and the pressure channels 308 and 304 are disposed from one another with a small elastomer film 316 of the first elastic member 20 separating the top of flow channels 104 and 108 from the bottom of pressure channel 308 and 304. When pressure is applied to the pressure channel(s) 304 and/or 308, the elastomer membrane 316 at large width portions 312 deflect to seal off the portions of the flow channels which are present beneath the pressure channels.

Figure 10:
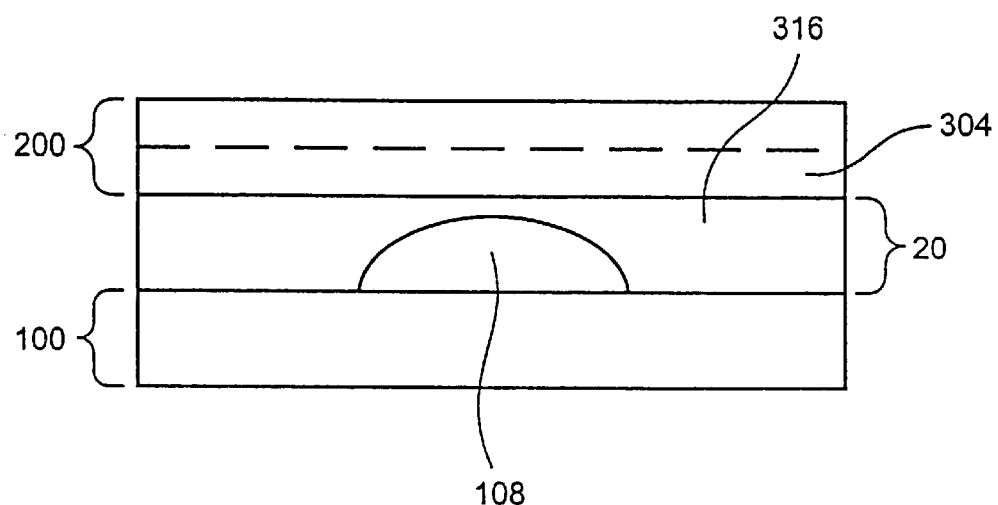
FIG. 10 is another sectional elevation view of a chemical reaction apparatus of the present invention having a solid support, a first elastic member, and a second elastic member.

Referring to FIG. 10, a cross sectional view (similar to that of FIG. 9B) flow channel 108 and pressure channel 304 are shown. As can be seen, flow channel 108 has a curved upper wall. The cross-section of flow channels can be any suitable shape. Typically; however, for single layer devices, the cross-section of flow channels are rectangular or rectangular with rounded corners shapes. For multilayer devices, the flow channels are preferably an arcuate-shape (i.e., the flow channels 108 and 104 are arcuate-shaped). When pressure channel 304 is pressurized, the elastomer film portion 316 of the first elastic member 20 separating flow channel 108 pressure channel 304 moves downwardly. An advantage of having such a curved upper surface at membrane 316 is that a complete seal will be provided when pressure channel 304 is pressurized. Specifically, the upper wall of the flow channel 108 will provide a continuous contacting edge against the solid support base 100, thereby providing a complete seal between the first elastic member 20 and the solid support base 100.

Another advantage of having a flow channel with curved upper surface is that the elastomer film 316 can more readily conform to the shape and volume of the flow channel in response to actuation. Specifically, where a rectangular flow channel is employed (not shown), the entire perimeter (2× flow channel height, plus the flow channel width) must be forced into the flow channel in order to achieve a complete seal. However where an arched flow channel is used, a smaller perimeter of material (only semi-circular portion, for example) must be forced into the flow channel to achieve a complete seal. In this manner, the elastomer film requires less change in perimeter for actuation and is therefore more responsive to an applied actuation force to block the flow channel.

Figure 11:
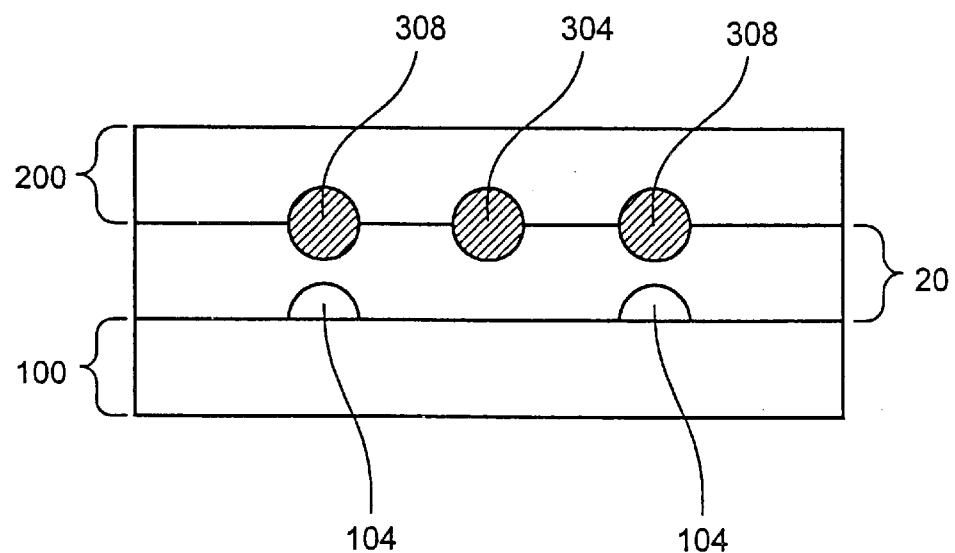
FIG. 11 is yet a sectional elevation view of a chemical reaction apparatus of the present invention having a solid support, a first elastic member, and a second elastic member, wherein the plurality of pressure channels are cylindrical.

In an alternate aspect, the bottom of pressure channels (304 and/or 308, i.e., portions of the first elastic member 20) is rounded such that its curved surface mates with the curved upper wall of pressure channels, as illustrated in FIG. 11.

Figure 12:
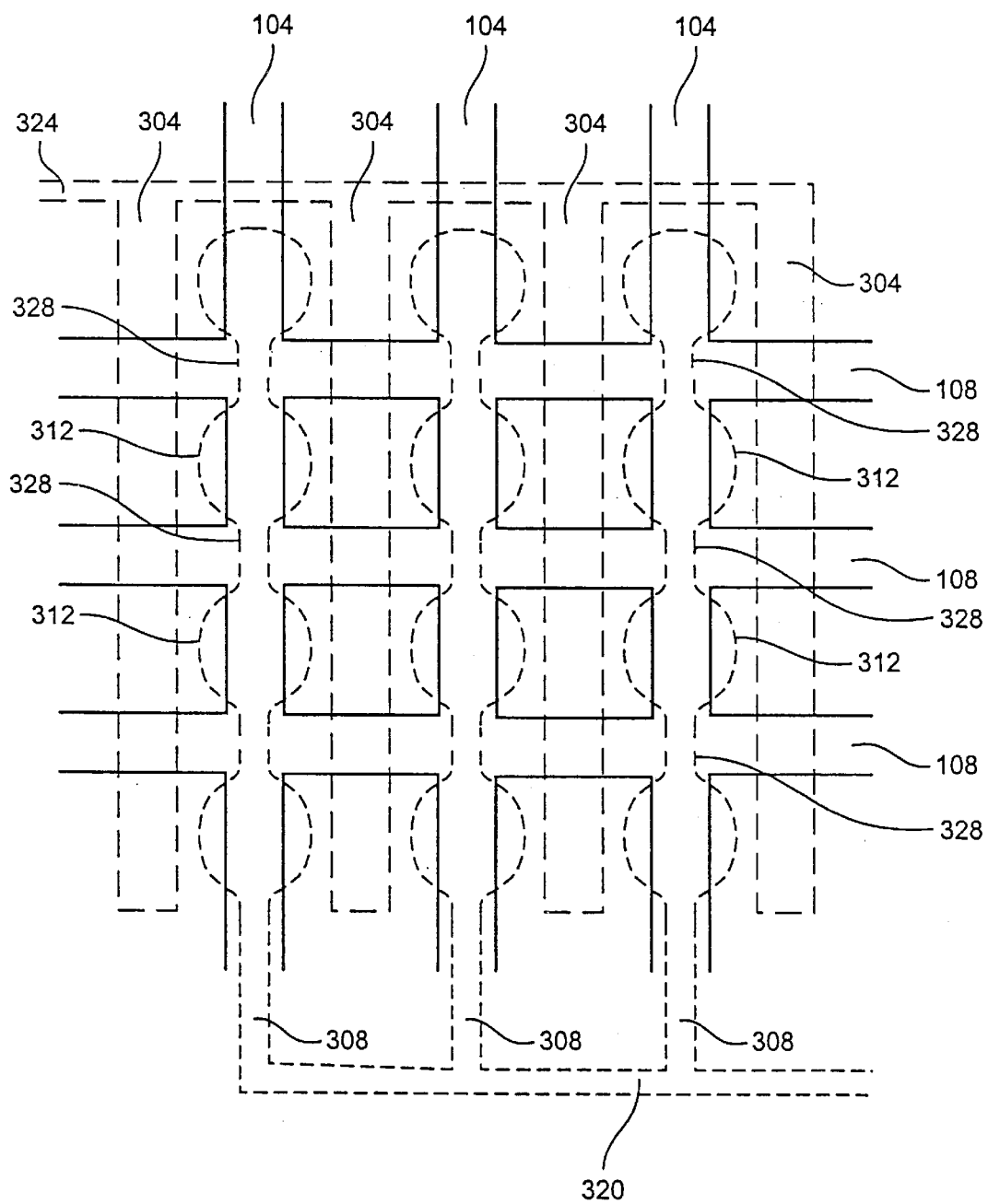
FIG. 12 is a schematic illustration of a chemical reaction apparatus having a first plurality of pressure channels for controlling flow within the first plurality of flow channels and a second plurality of pressure channels for controlling flow within the second plurality of flow channels.

As shown in FIG. 12, in a particularly preferred embodiment, all of the first plurality of flow channels 104 are controlled by a first plurality of pressure channels 308, which has one pressure inlet 320 with a manifold to provide pressure to all of the first plurality of pressure channels 308. In addition, there is a second plurality of pressure channels 304 which controls all of the second plurality of flow channels 108. The second plurality of pressure channels 304 has a pressure inlet 324 with a manifold to provide pressure to all of the second plurality of pressure channels 304. In this manner, when a pressure is applied to the first plurality of pressure channels 308, the large width portions 312 deflects downwards and closes off the first plurality of flow channels 104, thereby preventing any introduction of reagents into the first plurality of flow channels 104. Moreover, this closure of the first plurality of flow channels 104 allows introduction of reagents and/or solvents into the second plurality of flow channels 108 without any leakage into the first plurality of flow channels 104, i.e., undesired cross-contamination is avoided. Similarly, closure of the second plurality of flow channels 108 by pressurizing the second plurality of pressure channels 104 allows introductions of reagents and/or solvents into the first plurality of flow channels 104 without any leakage or contamination into the second plurality of flow channels 108.

Figure 13:
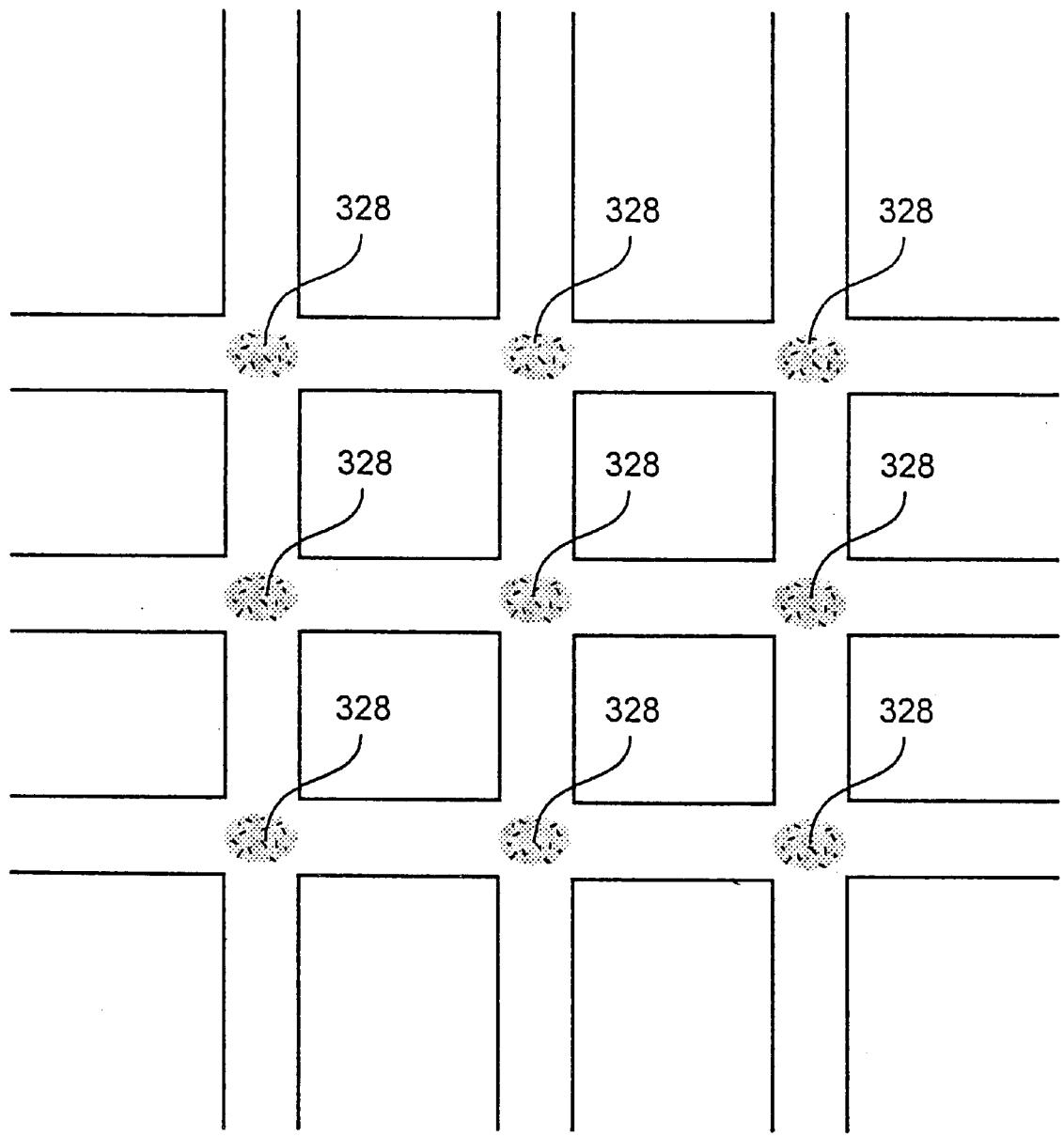
FIG. 13 is a schematic illustration of solid support with an array of compounds formed in the intersections of the first plurality of flow channels and the second plurality of flow channels.

Thus, only the intersections of the first plurality of flow channels 104 and the second plurality of flow channels 108 allow attachment of monomer which are introduced through the first or the second plurality of flow channels. In this manner, an array of compounds can be synthesized in the plurality of flow channel intersections 328. See FIG. 13. It should be appreciated that monomers may bond to along the entire section of the flow channels. However, this monomer bonding can be reduced or prevented with a capping step, or by derivatizing only selected portions of the solid support base.

In one particular embodiment of the present invention, the pressure channels are controlled by two pressure channel inlets. In this manner, one pressure channel inlet controls all the flow channels in the first plurality of flow channels and the other pressure channel inlet controls all the flow channels in the second plurality of flow channels. This provides simplicity of controlling the flow of fluids using only two different control systems, which is particularly useful in combinatorial synthesis. For example, one can close off all of the flow channels in the first plurality of flow channels and add a set of desired reagents to the flow channels in the second plurality of flow channels. One can then close off all of the flow channels in the second plurality of flow channels and add another set of desired reagents to the flow channels in the first plurality of flow channels. By repeating these two steps, polymerization of monomers in the intersection regions of the first plurality of flow channels and the second plurality of flow channels can be achieved.

In summary, the actual conformational change experienced by the elastomer film upon actuation will depend upon the configuration of the particular elastomeric structure. Specifically, the conformational change will depend upon the length, width, and thickness profile of the elastomer film, its attachment to the remainder of the structure, and the height, width, and shape of the flow and pressure channels and the material properties of the elastomer used. The conformational change may also depend upon the method of actuation, as actuation of the membrane in response to an applied pressure will vary somewhat from actuation in response to a magnetic or electrostatic force.

It should be appreciated that for a chemical reaction apparatus of the present invention having only one elastic member, there is no need for deformation of the flow channels to control (e.g., close) flow of reagents. Thus, the shape of the flow channels in such apparatus is not important. In fact, in many cases flow channels of such apparatus have a rectangular cross-sectional shape for simplicity in fabrication of such apparatus.

Many elastomer film thickness profiles, flow channel cross-sections, and pressure channel cross-sections are contemplated by the present invention, including rectangular, trapezoidal, circular, ellipsoidal, parabolic, hyperbolic, and polygonal, as well as sections of the above shapes. More complex cross-sectional shapes, such as an embodiment with protrusions or an embodiment having concavities in the flow channel, are also contemplated by the present invention.

While the above methods are illustrated in connection with forming various shaped elastomeric layers formed by replication molding on top of a micro-machined mold, the present invention is not limited to this technique. Other techniques could be employed to form the individual layers of shaped elastomeric material that are to be bonded together. For example, a shaped layer of elastomeric material could be formed by laser cutting or injection molding, or by methods utilizing chemical etching and/or sacrificial materials as discussed below in conjunction with the second exemplary method of fabrication.

Addition of Reagents into Flow Channels:

While any appropriate known methods for adding reagents can be used to add reagents to the chemical reaction apparatus of the present invention, a preferred method for adding a reagent into the flow channels of the chemical apparatus device of the present invention having an open end at the edge is to place a standard medical Luer stub (with a size that is larger than the flow channel size) into the flow channel, which typically remains in place by partial adhesion to the elastomer. A tubing or a syringe is then attached to the Luer stub for injection and/or extraction of the fluids into the flow channel.

For flow channels of a chemical apparatus device of the present invention having closed end edges, a preferred method for adding a reagent into the flow channels is to make (e.g., punch) holes in the flow channels up through the elastomer and out the top surface (alternatively, the holes can be made in the solid support), place Luer stubs into these holes, and attach tubing or syringes, or a similar device to the Luer stubs for injection and/or extraction of the fluids. The holes can also be made by embedding wires or other rigid structures in the elastomer while it is being cured, and removing the wires to leave a hole after the elastomer has fully cured.

The fluids are generally introduced through a tubing under pressure (e.g., pushed through by pressurized gas such as nitrogen or argon) or by using a syringe. The amount of pressure required to introduce the fluid depends on many factors such as the viscosity of the fluid as well as being limited by the adhesion strength of the first elastic layer to the solid support. However, the elastic member layer(s) can be held onto the solid support base mechanically, for example, by a clamp, to permit high pressures. Alternatively, the fluid is introduced via a pipette, and flows due to capillary forces.

Preferred Layer and Channel Dimensions:

It should be appreciated that a particular channel dimensions depend on a variety of factors including the particular elastomer used, speed or the rate of the fluid (e.g., solution) flow into and out of the flow channels desired, the viscosity of the fluids being used, the desired actuation pressure of the valves, etc.

In preferred aspects, the cross-section shape of flow channels 104 and 108, and pressure channels 304 and 308 is arcuate shape, i.e., curved shape, (e.g., semi-circle). It should be appreciated that the entire section of the flow channels need not be an arcuate shape. The arcuate shape is preferred at a portion of the flow channel which needs to be closed by the pressure channel. The following dimensions are directed mainly for silicone rubber elastomers. Preferably, the width of the flow channels is from about 0.1 $\mu$m to about 1 mm, more preferably from about 0.1 $\mu$m to about 100 $\mu$m, and most preferably from about 0.1 $\mu$m to about 10 $\mu$m. The height 355 of the flow channels is generally determined by the width of the flow channels. Thus, the ratio of width to the height of the channels is preferably in the range from about 100:1 to 1:10, more preferably about 10:1 to about 1:10, and most preferably about 10:1 to about 1:1.

As stated above, the pressure channels preferably comprise a large width portion and a small width portion. It should be appreciated that smaller width is preferred for the smaller width portions as they tend to not undergo sufficient change in dimensions to significantly deform the flow channels below. Typically, the smaller width portions have width that are no more than ½ of the width of the flow channels. In the large width portions, the width of pressure channels is preferably at least as wide or wider than the width of the flow channels below. Preferably the width of the large width portions is from about 1.0 or 2.0 times the width of the flow channels below. For example, for 100 μm width flow channels, the width of large width portions of the pressure channels is typically from about 100 μm to about 200 μm.

However, the flow channels and pressure channels are not limited to these specific dimension ranges, and may vary in width and/or height in order to affect the magnitude of force required to deflect the elastomer film 316, as discussed at length below in conjunction with FIG. 10. In addition, different overall dimensions of chemical apparatus can be used to achieve a different density of compounds in the array.

When only the first elastic member is used in the chemical reaction apparatus of the present invention, the thickness of the first elastic member 20 is typically in the range of about 100 μm to about 5 cm, preferably from about 1 mm to about 1 cm. A thicker first elastic member is typically needed to provide a sufficient surface area between the Luer stub and the first elastic member if the fluid is to be injected using Luer stubs and also to provide rigidity for ease of handling. However, a thinner first elastic member may be used if the fluid is to be added to the flow channels using a pipette.

If the chemical reaction apparatus includes the second elastic member, the first elastic member is typically spun on the mold to achieve a thickness of from about 10 nm to about 1 mm, preferably from about 10 nm to about 100 μm, and more preferably from about 10 nm to about 10 μm. While the thickness of the second elastic member 200 is not as important as the thickness of the first elastic member, the thickness of the second elastic member is typically similar to that of the first elastic member described above (i.e., from about 100 μm to about 5 cm, preferably from about 1 mm to about 1 cm).

It should be appreciated that the dimensions of harder elastomers can be significantly smaller. Such dimensions allow synthesis of very dense and large arrays of compounds on a single solid support.

Construction Techniques and Materials:

Preferably, the first elastic member 20 and the second elastic member 200 are bonded together chemically, using chemistry that is intrinsic to the polymers comprising the patterned elastomer layers. Most preferably, the bonding comprises two component "addition cure" bonding.

In a preferred aspect, the elastic member layers are bound together in a heterogenous bonding in which the layers have a different chemistry. Alternatively, a homogenous bonding may be used in which the layers would be of the same chemistry. Thirdly, the elastomer layers may optionally be glued together by an adhesive instead. In a fourth aspect, the elastomeric layers may be thermoset elastomers bonded together by heating.

The surface of the elastic layers may also be modified, for example, by flowing through materials such as Viton®, Teflon-AF®, polypropylene, or polyvinylidene flouride, etc. (e.g., dissolved in a solvent) to deposit such material along the inner surface of the flow channels and afford chemical resistance. Alternatively, the surface of elastic layer(s) can be modified by chemical treatment or plasma etching to modify the surface directly or to prepare it to receive a coating such as those described above. A coating material can be poured, sprayed, spin-coated, brushed, evaporated, plasma deposited, or flowed through the channels to coat the inner surface of the channels. Alternatively, parts of the elastic member(s) or the solid support can be dipped or soaked in a solution to apply the coating material.

In one aspect of homogeneous bonding, the elastomeric layers are composed of the same elastomer material, with the same chemical entity in one layer reacting with the same chemical entity in the other layer to bond the layers together. Bonding between polymer chains of like elastomer layers may result from activation of a cross-linking agent due to light, heat, or chemical reaction.

Alternatively in a heterogeneous aspect, the elastomeric layers are composed of different elastomeric materials, with a first chemical entity in one layer reacting with a second chemical entity in another layer. In one exemplary heterogenous aspect, the bonding process used to bind respective elastomeric layers together may comprise bonding together two layers of silicone rubber each comprising a two-part components. For bonding, one layer may be made with excess of the first component and the other excess of the other component: each layer is cured separately, and when the two layers are brought into contact and cured at elevated temperature, they bond irreversibly forming an integrated elastomer structure 300.

Alternatively, other bonding methods may be used including activating the elastomer surface, for example, by plasma exposure, so that the elastomer layers/substrate will bond when placed in contact. For example, one possible approach to bonding together elastomer layers composed of the same material is set forth by Duffy et al., "Rapid Prototyping of Microfluidic Systems in Pdy (Polydimethylsiloxane)", *Analytical Chemistry* 1998, 70, 4974–4984, which is incorporated herein by reference in its entirety. This paper discusses that exposing polydimethylsiloxane (PDMS) layers to oxygen plasma causes oxidation of the surface, with irreversible bonding occurring when the two oxidized layers are placed into contact. Another approach to bonding together layers of elastomer is set forth by Chiu et al., "Patterned Deposition of Cells and Proteins onto surfaces by Using Three-Dimensional Microfluidic Systems", *Proc. Natl. Acad. Sci.*, 2000, 97, 2408–2413, which is incorporated herein by reference in its entirety.

Still another approach is disclosed in Anderson et al., "Fabrication of Topologically Complex Three-Dimensional Microfluidic Systems in PDMS by Rapic Prototyping," *Analytical Chemistry*, 2000, 72(14), 3158–3164, which is incorporated herein by reference in its entirety. This approach allows 2–3 layers of elastic members to be formed all at once such that no bonding between elastic member layer is needed.

Yet another approach to bonding together successive layers of elastomer is to utilize the adhesive properties of uncured elastomer. Specifically, a thin layer of uncured elastomer is applied on top of a first cured elastomeric layer. Next, a second cured elastomeric layer is placed on top of the uncured elastomeric layer. The thin middle layer of uncured elastomer is then cured to produce an integrated elastomer structure. Alternatively, uncured elastomer can be applied to the bottom of a first cured elastomer layer, with the first cured elastomer layer placed on top of a second cured elastomer layer. Curing the middle thin elastomer layer again results in formation of an integrated elastomer structure.

Suitable Solid Support Base Materials:

The chemical reaction apparatus of the present invention allows synthesis of an array of compounds on the solid support base 10. Therefore, any material which can be derivatized to allow attachment of a monomer, or a linker molecule, can be used as the solid support base 10. Exemplary materials suitable for the solid support base 10 of the present invention include, but are not limited to, glass (including controlled-pore glass), polystyrene, polystyrene-divinylbenzene copolymer (e.g., for synthesis of peptides), silicone rubber, quartz, latex, polyurethane, gold and other derivatizable transition metals, silicon dioxide, silicon nitride, gallium arsenide, and the like. Solid support base materials are generally resistant to the variety of chemical reaction conditions to which they may be subjected.

Individual planar solid support bases can have varied dimensions from which a plurality of individual arrays or chips may be fabricated. The term "array" or "chip" is used to refer to the final product of the individual array of polymer sequences, having a plurality of different positionally distinct polymer sequences coupled to the surface of the solid support. The size of a solid support base is generally defined by the number and nature of arrays that will be produced from the solid support. For example, more complex arrays, e.g., arrays having all possible polymer sequences produced from a basis set of monomers and having a given length, will generally utilize larger areas and thus employ larger solid support, whereas simpler arrays may employ smaller surface areas, and thus, smaller solid support.

The size of solid support generally depends on the number of polymer arrays desired. Typically, however, the solid support dimensions can be anywhere from about 1 cm×1 cm to about 30 cm×30 cm. Generally, a large polymer array requires a relatively large solid support and a small polymer array requires a relatively small solid support. In one particular embodiment of the present invention, the solid support is a standard 1"×3" or 2"×3" glass microscope slides, or 1"×1", 1.5"×1.5", or 2"×2" quartz glass windows.

Stripping and Rinsing

In order to ensure maximum efficiency and accuracy in synthesizing polymer arrays, it is generally desirable to provide a clean solid support surface upon which the various reactions are to take place. Accordingly, in some processing embodiments of the present invention, the solid support is stripped to remove any residual dirt, oils or other materials which may interfere with the synthesis reactions.

The process of stripping the substrate typically involves applying, immersing or otherwise contacting the solid support with a stripping solution. Stripping solutions may be selected from a number of commercially available, or readily prepared chemical solutions used for the removal of dirt and oils, which solutions are well known in the art. Particularly preferred stripping solutions are composed of a mixture of concentrated $H_2O_2$ and $NH_4OH$. Gas phase cleaning and preparation methods may also be applied to the solid support using techniques that are well known in the art.

Derivatization

While not necessary, after the solid support surface has been cleaned and stripped, the surface may be derivatized to provide other sites or functional groups on the solid support surface for synthesizing the various polymer sequences. In particular, derivatization provides reactive functional groups, e.g., hydroxyl, carboxyl, amino groups or the like, to which the first monomers in the polymer sequence can be attached. In preferred aspects, the solid support surface is derivatized using silane in either water or ethanol. Preferred silanes include mono- and dihydroxyalkylsilanes, which provide a hydroxyl functional group on the surface of the substrate. Also preferred are aminoalkyltrialkoxysilanes which can be used to provide the initial surface modification with a reactive amine functional group. Particularly preferred are 3-aminopropyltriethoxysilane and 3-aminopropyltrimethoxysilane ("APS"). Derivatization of the substrate using these latter amino silanes provides a linkage that is stable under synthesis conditions and final deprotection conditions (for oligonucleotide synthesis, this linkage is typically a phosphoramidite linkage, as compared to the phosphodiester linkage where hydroxyalkylsilanes are used). Additionally, this amino silane derivatization provides several advantages over derivatization with hydroxyalkylsilanes. For example, the aminoalkyltrialkoxysilanes are inexpensive and can be obtained commercially in high purity from a variety of sources, the resulting primary and secondary amine functional groups are more reactive nucleophiles than hydroxyl groups, the aminoalkyltrialkoxysilanes are less prone to polymerization during storage, and they are sufficiently volatile to allow application in a gas phase in a controlled vapor deposition process. Other suitable linkers are well known to one of ordinary skill in the art.

Additionally, silanes can be prepared having protected or "masked" hydroxyl groups and which possess significant volatility. As such, these silanes can be readily purified, e.g., by distillation, and can be readily employed in gas-phase deposition methods of silanating solid support surfaces. After coating these silanes onto the surface of the solid support, the hydroxyl groups may be deprotected with a brief chemical treatment, e.g., dilute acid or base, which will not attack the solid support-silane bond, so that the solid support can then be used for polymer synthesis. Examples of such silanes include acetoxyalkylsilanes, such as acetoxyethyltrichlorosilane, acetoxypropyltrimethoxysilane, which may be deprotected after application, e.g., using vapor phase ammonia and methylamine or liquid phase aqueous or ethanolic ammonia and alkylamines.

The physical operation of silanation of the solid support generally involves dipping or otherwise immersing the solid support in the silane solution. Following immersion, the solid support is generally spun laterally to provide a uniform distribution of the silane solution across the surface of the solid support. This ensures a more even distribution of reactive functional groups on the surface of the solid support. Following application of the silane layer, the silanated solid support may be baked to polymerize the silanes on the surface of the solid support and improve the reaction between the silane reagent and the solid support surface.

In alternative aspects, the silane solution may be contacted with the surface of the solid support using controlled vapor deposition methods or spray methods. These methods involve the volatilization or atomization of the silane solution into a gas phase or spray, followed by deposition of the gas phase or spray upon the surface of the solid support, usually by ambient exposure of the surface of the solid support to the gas phase or spray. Vapor deposition typically results in a more even application of the derivatization solution than simply immersing the solid support into the solution.

The efficacy of the derivatization process, e.g., the density and uniformity of functional groups on the solid support surface, may generally be assessed by adding a fluorophore which binds the reactive groups, e.g., a fluorescent phosphoramidite such as Fluoreprim® from Pharmacia, Corp., Fluoredite® from Millipore, Corp. or FAM® from ABI, and looking at the relative fluorescence across the surface of the solid support.

Suitable Elastomeric Materials:

As stated above, there is no need for the "elastic member" to be pliable for a chemical reaction apparatus having only one elastic member. Thus, for such apparatus the elastic member can include glass and non-elastic polymers such as Teflon®, plastic resins such as polypropylene resin, and the like.

In addition, the elastic members of the apparatus of the present invention comprising two or more elastic member layers may be fabricated from a wide variety of elastomers. In an exemplary aspect, elastomeric layers 20 and 200 may be fabricated from polyurethanes, isoprene polymers, and preferably silicone rubber. However, other suitable elastomers may also be used. It should be appreciated that the present invention is not limited to these types or even families of polymers; rather, nearly any elastomeric polymer is suitable. An important requirement for the preferred method of fabrication of the present elastomers is the ability to bond multiple layers of elastomers together. In the case of multilayer soft lithography, layers of elastomer are cured separately and then bonded together. This scheme requires that cured layers possess sufficient reactivity to bond together. Either the layers may be of the same type, and are capable of bonding to themselves (A to A), or they may be of two different types, and are capable of bonding to each other (A to B). (Another possibility is to use an adhesive between layers.)

Given the tremendous diversity of polymer chemistries, precursors, synthetic methods, reaction conditions, and potential additives, there are a huge number of possible elastomer systems that could be used to make chemical reaction apparatus of the present invention. Variations in the materials used will most likely be driven by the need for particular material properties, i.e., solvent resistance, stiffness, gas permeability, temperature stability, and/or reasonable adhesion to the solid support.

There are many types of elastomeric polymers. A brief description of the most common classes of elastomers is presented here, with the intent of showing that even with relatively "standard" polymers, many possibilities for bonding exist. Common elastomeric polymers include polyisoprene, polybutadiene, polychloroprene, polyisobutylene, poly(styrene-butadiene-styrene), the polyurethanes, and silicones.

Polyisoprene, polybutadiene, polychloroprene:

Polyisoprene, polybutadiene, and polychloroprene are all polymerized from diene monomers, and therefore have one double bond per monomer when polymerized. This double bond allows the polymers to be converted to elastomers by vulcanization (essentially, sulfur is used to form crosslinks between the double bonds by heating). This would easily allow homogeneous multilayer soft lithography by incomplete vulcanization of the layers to be bonded.

Polyisobutylene:

Pure polyisobutylene has no double bonds, but is crosslinked to use as an elastomer by including a small amount (~1%) of isoprene in the polymerization. The isoprene monomers give pendant double bonds on the polyisobutylene backbone, which may then be vulcanized as above.

Poly(styrene-butadiene-styrene):

Poly(styrene-butadiene-styrene) is produced by living anionic polymerization (that is, there is no natural chain terminating step in the reaction), so "live" polymer ends can exist in the cured polymer. This makes it a natural candidate for the present photoresist encapsulation system (where there will be plenty of unreacted monomer in the liquid layer poured on top of the cured layer). Incomplete curing would allow homogeneous multilayer soft lithography (A to A bonding). The chemistry also facilitates making one layer with extra butadiene ("A") and coupling agent and the other layer ("B") with a butadiene deficit (for heterogeneous multilayer soft lithography). SBS is a "thermoset elastomer", meaning that above a certain temperature it melts and becomes plastic (as opposed to elastic); reducing the temperature yields the elastomer again. Thus, layers can be bonded together by heating.

Polyurethanes:

Polyurethanes are produced from di-isocyanates (A—A) and di-alcohols or di-amines (B—B); since there are a large variety of di-isocyanates and di-alcohols/amines, the number of different types of polyurethanes is huge. The A vs. B nature of the polymers, however, would make them useful for heterogeneous multilayer soft lithography just as RTV 615 is: by using excess A—A in one layer and excess B—B in the other layer.

Silicones:

Silicone polymers probably have the greatest structural variety, and almost certainly have the greatest number of commercially available formulations. The vinyl-to-(Si—H) crosslinking of RTV 615 (which allows both heterogeneous multilayer soft lithography) is only one of several crosslinking methods used in silicone polymer chemistry.

Cross Linking Agents:

In addition to the use of the simple "pure" polymers discussed above, crosslinking agents may be added. Some agents (like the monomers bearing pendant double bonds for vulcanization) are suitable for allowing homogeneous (A to A) multilayer soft lithography or photoresist encapsulation; in such an approach the same agent is incorporated into both elastomer layers. Complementary agents (i.e. one monomer bearing a pendant double bond, and another bearing a pendant Si—H group) are suitable for heterogeneous (A to B) multilayer soft lithography. In this approach complementary agents are added to adjacent layers.

Other Materials:

In addition, silicon containing materials such as chlorosilanes may also be used. Suitable silicon containing materials include, but are not limited to, methyl-, ethyl-, and phenylsilanes, for example, polydimethylsiloxane (PDMS) such as Dow Chemical Corp. Sylgard 182, 184 or 186; and alipathic urethane diacrylates such as Ebecryl 270 or Irr 245 which are available from UCB Chemical.

The following is a non-exclusive list of elastomeric materials which may be utilized in connection with the present invention: epoxy acrylates such as Ebecryl resins 3500® and 3708®, polyisoprene, polybutadiene, polychloroprene, polyisobutylene, poly(styrene-butadiene-styrene), the polyurethanes, and silicone polymers; or poly(bis(fluoroalkoxy)phosphazene) (PNF, Eypel-F), poly(carborane-siloxanes) (Dexsil), poly(acrylonitrile-butadiene) (nitrile rubber), poly(1-butene), poly(chlorotrifluoroethylene-vinylidene fluoride) copolymers (Kel-F), poly(ethyl vinyl ether), poly(vinylidene fluoride), poly(vinylidene fluoride-hexafluoropropylene) copolymer (Viton), elastomeric compositions of polyvinylchloride (PVC), polysulfone, polycarbonate, polymethylmethacrylate (PMMA), and polytertrafluoroethylene (Teflon).

Doping and Dilution:

Elastomers may also be "doped" with uncrosslinkable polymer chains of the same class. For instance GE RTV 615 may be diluted with GE SF96-50 Silicone Fluid. This serves to reduce the viscosity of the uncured elastomer and reduces the Young's modulus of the cured elastomer. Essentially, the crosslink-capable polymer chains are spread further apart by the addition of "inert" polymer chains, so this is called "dilution". RTV 615 cures at up to 90% dilution, with a dramatic reduction in Young's modulus.

Other examples of doping of elastomer material may include the introduction of electrically conducting or magnetic species, as described in detail below in conjunction with alternative methods of actuating the membrane of the device. Should it be desired, doping with fine particles of material having an index of refraction different than the elastomeric material (i.e. silica, diamond, sapphire) is also contemplated as a system for altering the refractive index of the material. Strongly absorbing or opaque particles may be added to render the elastomer colored or opaque to incident radiation. This may conceivably be beneficial in an optically addressable system.

Finally, by doping the elastomer with specific chemical species, these doped chemical species may be presented at the elastomer surface, thus serving as anchors or starting points for further chemical derivatization or providing chemical resistance.

Pre-Treatment and Surface Coating

Once the elastomeric material has been molded or etched into the appropriate shape, it may be necessary to pre-treat the material in order to facilitate operation in connection with a particular application. For example, in order to reduce or prevent elastomer from dissolving in the solvent, one can coat the inner walls of the flow channels with polypropylene, polyvinylidene fluoride, Viton® or other suitable inert materials.

While control of the flow of material through the device has so far been described utilizing applied air pressure in the pressure channels, other fluids could be used. For example, air is compressible, and thus experiences some finite delay between the time of application of pressure by the external activator (e.g., solenoid valve) and the time that this pressure is experienced by the membrane. In an alternative embodiment of the present invention, pressure could be applied from an external source to a noncompressible fluid such as water or hydraulic oils, resulting in a near-instantaneous transfer of this pressure to the membrane. However, if the displaced volume of the valve is large or the pressure channel is narrow, higher viscosity of a control fluid may contribute to delay in actuation. The optimal medium for transferring pressure will therefore depend upon the particular application and device configuration, and both gaseous and liquid media are contemplated by the invention.

Alternate Valve Actuation Techniques:

In addition to pressure based actuation systems described above, optional electrostatic and magnetic actuation systems are also contemplated, as follows.

Electrostatic actuation can be accomplished by forming oppositely charged electrodes (which will tend to attract one another when a voltage differential is applied to them) directly into the elastomer structure 300. For example, an optional first electrode (not shown) can be positioned on (or in) thin elastic film 316 and an optional second electrode (not shown) can be positioned on (or in) solid support base 10. When these electrodes are charged with opposite polarities, an attractive force between the two electrodes will cause the thin elastic film 316 to deflect downwardly, thereby closing the "valve" (e.g., closing flow channel 104).

For the thin elastic film electrode to be sufficiently conductive to support electrostatic actuation, but not so mechanically stiff so as to impede the valve's motion, a sufficiently flexible electrode must be provided in or over thin elastic film 316. Such an electrode may be provided by a thin metallization layer, doping the polymer with conductive material, or making the surface layer out of a conductive material.

In an exemplary aspect, the electrode present at the deflecting thin elastic film 316 can be provided by a thin metallization layer which can be provided, for example, by sputtering a thin layer of metal. In addition to the formation of a metallized membrane by sputtering, other metallization approaches such as chemical epitaxy, evaporation, electroplating, and electroless plating are also available. Physical transfer of a metal layer to the surface of the elastomer is also available, for example, by evaporating a metal onto a flat substrate to which it adheres poorly, and then placing the elastomer onto the metal and peeling the metal off of the substrate.

A conductive electrode may also be formed by depositing carbon black on the elastomer surface, either by wiping on the dry powder or by exposing the elastomer to a suspension which causes swelling of the elastomer, such as the exposure of PDMS to a chlorinated solvent. Alternatively, the electrode may be formed by constructing the entire elastic member 20 out of an elastomer doped with conductive material (e.g., carbon black or finely divided metal particles). Yet further alternatively, the electrode may be formed by electrostatic deposition, or by a chemical reaction that produces carbon. The lower electrode, which is not required to move, may be either a compliant electrode as described above, or a conventional electrode such as evaporated gold, a metal plate, or a semiconductor doped electrode.

Alternatively, magnetic actuation of the flow channels can be achieved by fabricating the thin elastic film separating the flow channel and the pressure channel with a magnetically polarizable material such as iron, or a permanently magnetized material. Where the film is fabricated with a material capable of maintaining permanent magnetization, the material can first be magnetized by exposure to a sufficiently high magnetic field, and then actuated either by attraction or repulsion in response to the polarity of an applied magnetic field.

The magnetic field causing actuation of the thin elastic film can be generated in a variety of ways. In one embodiment, the magnetic field is generated by an extremely small inductive coil formed in or proximate to the thin elastomer film 316. The actuation effect of such a magnetic coil would be localized, allowing actuation of individual pump and/or valve structures. Alternatively, the magnetic field could be generated by a larger, more powerful source, in which case actuation would be global and would actuate multiple pump and/or valve structures at one time.

In addition to electrical or magnetic actuation as described above, other methods known to one skilled in the art of microfluidic systems such as electrolytic and electrokinetic actuation systems are also contemplated by the present invention. For example, actuation pressure on the thin elastic film could arise from an electrolytic fluid flow in the pressure channel. In such an embodiment, electrodes present at opposite ends of the pressure channel would apply a voltage across an electrolyte in the pressure channel. This potential difference would cause electrochemical reaction at the electrodes and result in the generation of gas species, giving rise to a pressure differential in the pressure channel.

At the locations where the respective pressure channel is wide, its pressurization will cause the thin elastic film 316 separating the flow channel and the pressure channel to depress significantly into the flow channel, thereby blocking the flow passage therethrough. Conversely, in the locations where the respective pressure channel is narrow, thin elastic film 316 will also be narrow. Accordingly, the same degree of pressurization will not result in the thin elastic film 316 becoming depressed into the flow channel 104. Therefore, fluid passage thereunder will not be blocked.

Other variations to the methods and apparatuses of the present invention disclosed above include having flow channels etched into the solid support base with one flat elastic member layer on top, and a second elastic member layer containing pressure channels on top of the flat first elastic member layer. In this manner, the pressure channels in the second elastic member layer deflect the first elastic member layer down into the channels in the solid support base (which may be made of a rigid material) to close the flow channels at particular places. In addition, a total of three elastic members can be used where the second elastic member controls the first plurality of flow channels and the third elastic member controls the second plurality of flow channels.

Additional objects, advantages, and novel features of this invention will become apparent to those skilled in the art upon examination of the following examples thereof, which are not intended to be limiting.

EXAMPLES

Example 1

This example illustrates a process for synthesizing an array of all possible DNA 6-mers using a chemical apparatus of the present invention which has one elastomer member. It should be appreciated that the "elastic member" of such an apparatus need not be an elastomer, provided one can obtain a good seal with the solid support either by temporary adhesion or by applying pressure.

Figure 14:
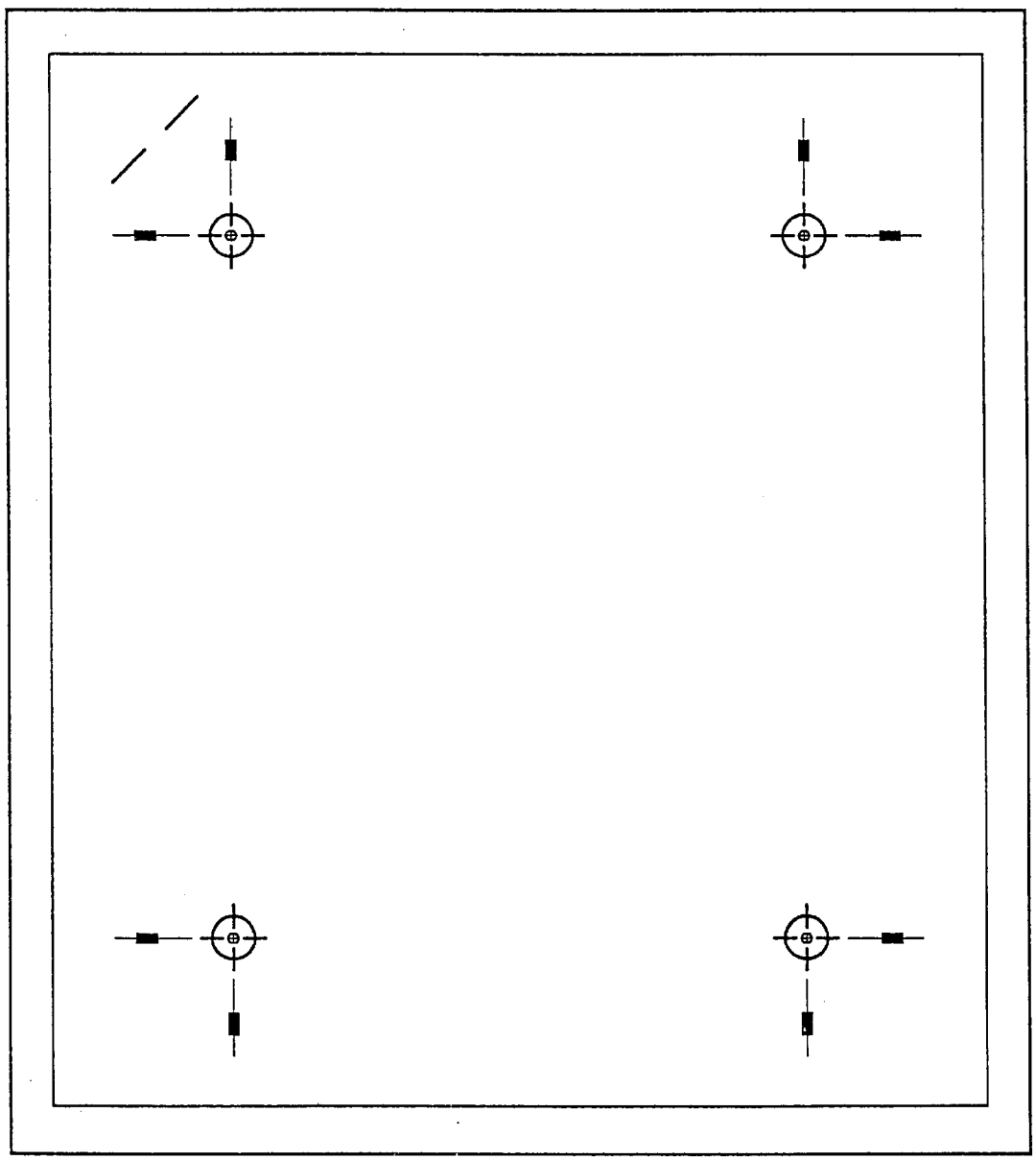
FIG. 14 is a schematic drawing of a mask having four alignment marks ear the corners which is etched into the solid support for alignment purposes as illustrated in Example 1, where the two short diagonal lines in the upper left hand corner are "orientation marks"

The solid support is etched with the pattern shown in FIG. 14 for alignment purposes. There are four alignment marks near the corners. These line up with the corresponding alignment marks on patterns shown in FIGS. 15, 16 and 17. The two short diagonal lines in the upper left hand corner are "orientation marks."

Figure 15:
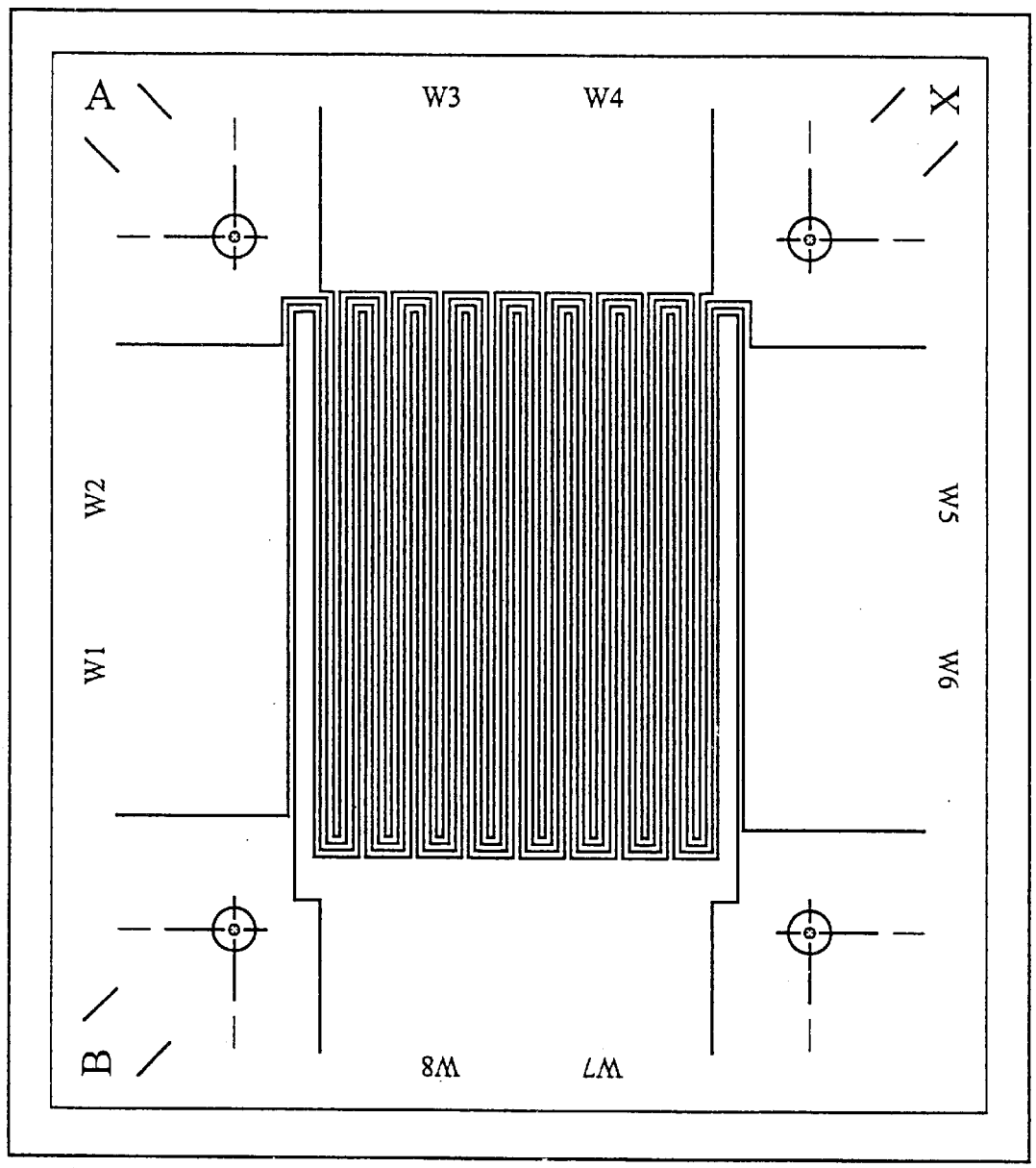
FIGS. 15–17 are schematic drawings of patterns (i.e., masks) which are used to make three molds for three elastic members for a single elastic layer chemical reaction apparatus as illustrated in Example 1.
Figure 16:
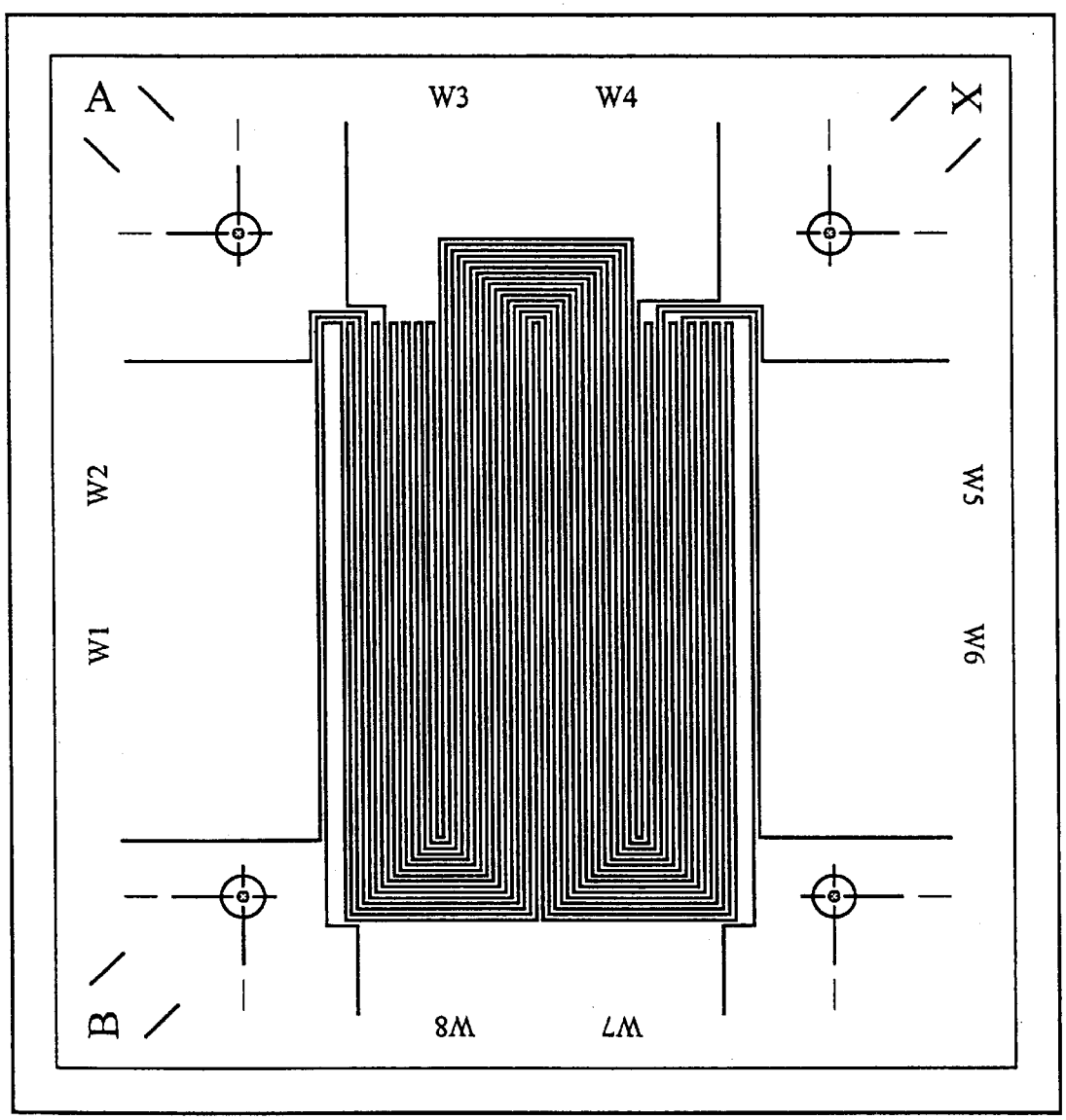
Figure 17:
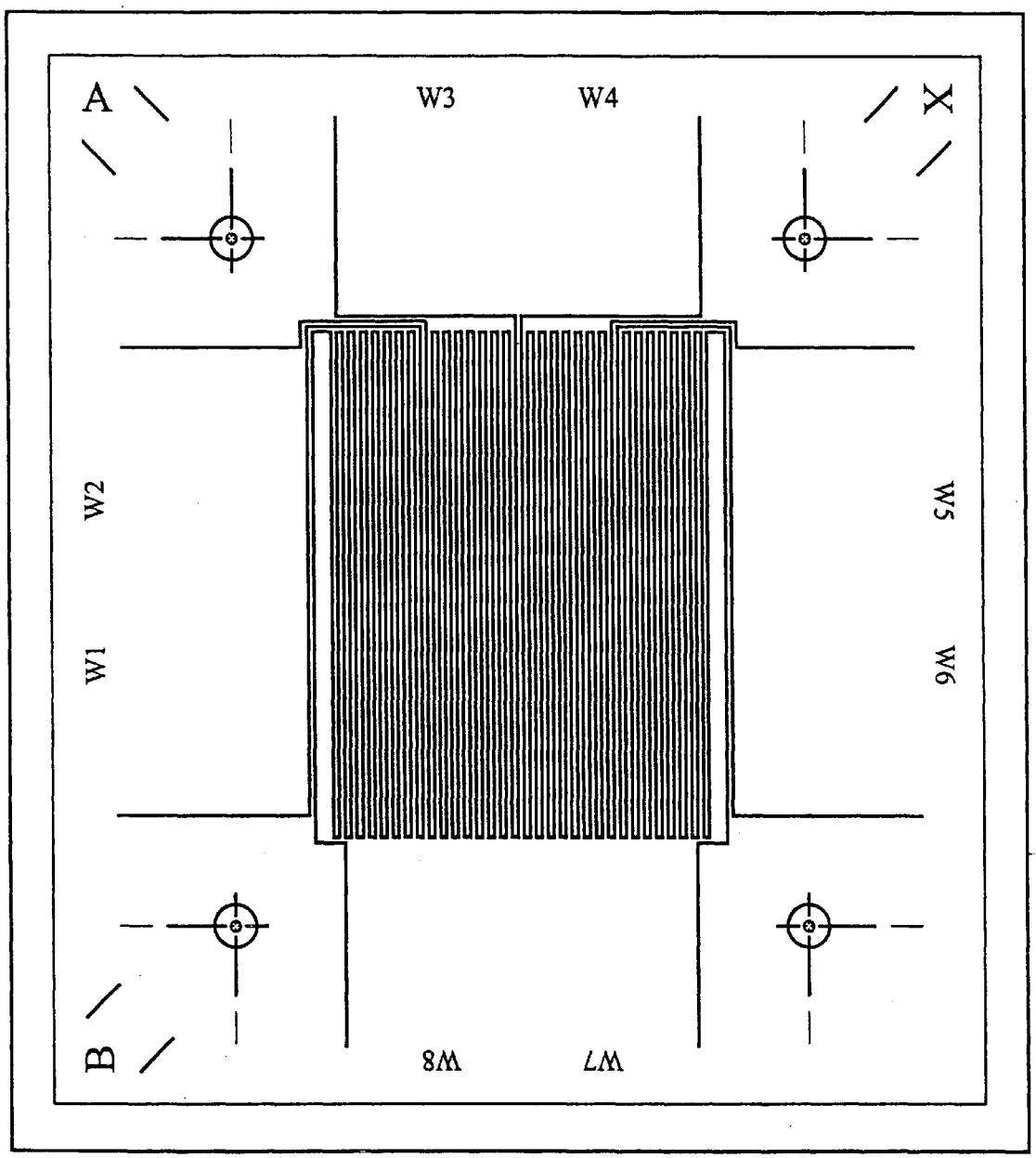

FIGS. 15, 16 and 17 are the patterns that are used to make the molds for elastomer members. Thus, three elastic members are made from these molds, i.e., elastic members 1, 2, 3 from FIGS. 15, 16 and 17, respectively. Looking down through the top surface of each elastic member, one can see the pattern exactly as illustrated in these Figures. Centered in each Figure is a dense pattern of flow channels. These channels all terminate abruptly near the edge of the pattern. Each of the three elastic members has four distinct flow channels in it with each flow channels crossing the center section 16 times.

The short diagonal lines in three of the corners (with "A", "B", "X") line up with the short diagonal lines on the solid support. For example, when elastic member 1 is aligned on top of the solid support, there will be two small crosses in the upper left corner, near the 'A' marking. When elastic member 1 is first rotated clockwise by 90 degrees before alignment (solid support never moves), the cross pattern will be close to the 'B' marking. (If the crosses are near the 'X' corner or the blank corner, the orientation is incorrect.) The above orientations of elastic member 1 with respect to the solid support are referred to as the "A-orientation" and "B-orientation," respectively.

In this particular embodiment, holes are punched or drilled through the elastomers near the ends of the channels which can serve as the site for injection. These sites are labeled as W1, W2, . . . , and W8. Each of the four channels in each elastomer has only one inlet and one outlet. Thus, if the fluid reaches the outlet, it indicates that the fluid has reached every point in the channel. Otherwise, if fluid flowed through all 16 crossings simultaneously, one would have to watch very carefully that the fluid has made it through all 16 individual paths. However, this latter approach may be preferably if a faster flow rate is desired.

DNA synthesis typically involves 4 general steps: (i) deblocking; (ii) coupling; (iii) capping; (iv) oxidizing. Steps (i), (iii), (iv) can be accomplished using variety of methods, but for the purposes of this example, by removing the elastic member and immersing the solid support in the relevant reagents. Step (ii) can be generally performed with the elastomer member affixed to the solid support.

Step 1:

The elastic member 1 (having a pattern shown in FIG. 15) was aligned in the A-orientation with the solid support and then attached thereto. This can be done under a microscope or on a photolithographic mask-aligner. Coupling reagents were then added to the apparatus through the channels such that nucleotide A flowed from W8 to W7, C flowed from W1 to W6, G flowed from W2 to W5, and T flowed from W3 to W4. All the channels were then washed to remove non-attached nucleotides. The elastic member 1 was then removed from the solid support. The resulting solid support was then immersed in a solution comprising a capping reagent to cap the nucleic acids. The capped nucleic acids were then oxidized and deblocked.

During step 1, the following pattern of 64 vertical stripes of first nucleotides were thus "created" (reading a single row of the array from left to right):

ACGTTGCAACGTTGCAACGTTGCAACGTTGCAA CGTTGCAACGTTGCAACGTT GCAACGTTGCA.

At this point, the solid support is preferably dried with nitrogen or argon.

Step 2:

The elastic member 1 was aligned in the B-orientation with the solid support. Note that the positions of "W1", "W2", etc. were rotated. Step 2 refers to these new rotated positions. Another set of coupling reagents were then added through the channels such that nucleotide A flowed from W8 to W7, C flowed from W1 to W6, G flowed from W2 to W5, and T flowed from W3 to W4. All the channels were then washed to remove non-attached nucleotides. The elastic member 1 was then removed from the solid support. The resulting solid support was then immersed in a solution comprising a capping reagent to cap the nucleic acids. The capped nucleic acids were then oxidized and deblocked.

Step 2 added a second nucleotide to each array position, this time as uniform horizontal stripes.

Step 3:

The elastic member 2 (having a pattern shown in FIG. 16) was aligned in the A-orientation with the solid support. Coupling reagents were then added to the apparatus through the channels such that nucleotide A flowed from W8 to W1, C flowed from W2 to W3, G flowed from W4 to W5, and T flowed from W6 to W7. All the channels were then washed to remove non-attached nucleotides. The elastic member 2 was then removed from the solid support. The resulting solid support was then immersed in a solution comprising a capping reagent to cap the nucleic acids. The capped nucleic acids were then oxidized and deblocked.

During step 3, the following pattern of 64 vertical stripes of third nucleotides were thus "added" (reading a single row from left to right):

AAAACCCCGGGGTTTTTTTGGGGCCCCAAAAA AAACCCCGGGGTTTTTTTG GGGCCCCAAAA

Step 4:

The elastic member 2 was aligned in the B-orientation with the solid support. Another set of coupling reagents were then added through the channels such that nucleotide A flowed from W8 to W1, C flow from W2 to W3, G flow from W4 to W5, and T flowed from W6 to W7. All the channels were then washed to remove non-attached nucleotides. The elastic member 2 was then removed from the solid support. The resulting solid support was then immersed in a solution comprising a capping reagent to cap the nucleic acids. The capped nucleic acids were then oxidized and deblocked.

Step 4 added a fourth nucleotide to each position on the array as horizontal stripes.

Step 5:

The elastic member 3 (having a pattern shown in FIG. 17) was aligned in the A-orientation with the solid support. Coupling reagents were then added to the apparatus through the channels such that nucleotide A flowed from W8 to W1, C flowed from W2 to W3, G flowed from W4 to W5, and T flowed from W6 to W7. All the channels were then washed to remove non-attached nucleotides. The elastic member was then removed from the solid support. The resulting solid support was then immersed in a solution comprising a capping reagent to cap the nucleic acids. The capped nucleic acids were then oxidized and deblocked.

During step 5, the following set of 64 vertical stripes of fifth-nucleotides were thus "added" (reading a single row from left to right):

AAAAAAAAAAAAAAAACCCCCCCCCCCCCCCG
GGGGGGGGGGGGGGGGTTTTTTTTTTTTTTTT

Step 6:

The elastic member 3 was aligned in the B-orientation with the solid support. Another set of coupling reagents were then added through the channels such that nucleotide A flow from W8 to W1, C flowed from W2 to W3, G flowed from W4 to W5, and T flowed from W6 to W7. All the channels were then washed to remove non-attached nucleotides. The elastic member was then removed from the solid support. The resulting solid support was then immersed in a solution comprising a capping reagent to cap the nucleic acids. The capped nucleic acids were then oxidized and deblocked.

Step 6 added a sixth nucleotide at each position on the array in uniform horizontal stripes.

A final deprotection for the whole array was achieved by immersing the entire solid support in a solution comprising a deprotecting reagent.

In this manner, an array of all possible DNA 6-mers was created on a single solid support.

Example 2

This example illustrates a method for synthesizing an array of all possible DNA 4-mers using a chemical reaction apparatus of the present invention which includes a solid support with a two-layer elastic device containing valves for controlling the fluid flow.

Figure 18A:
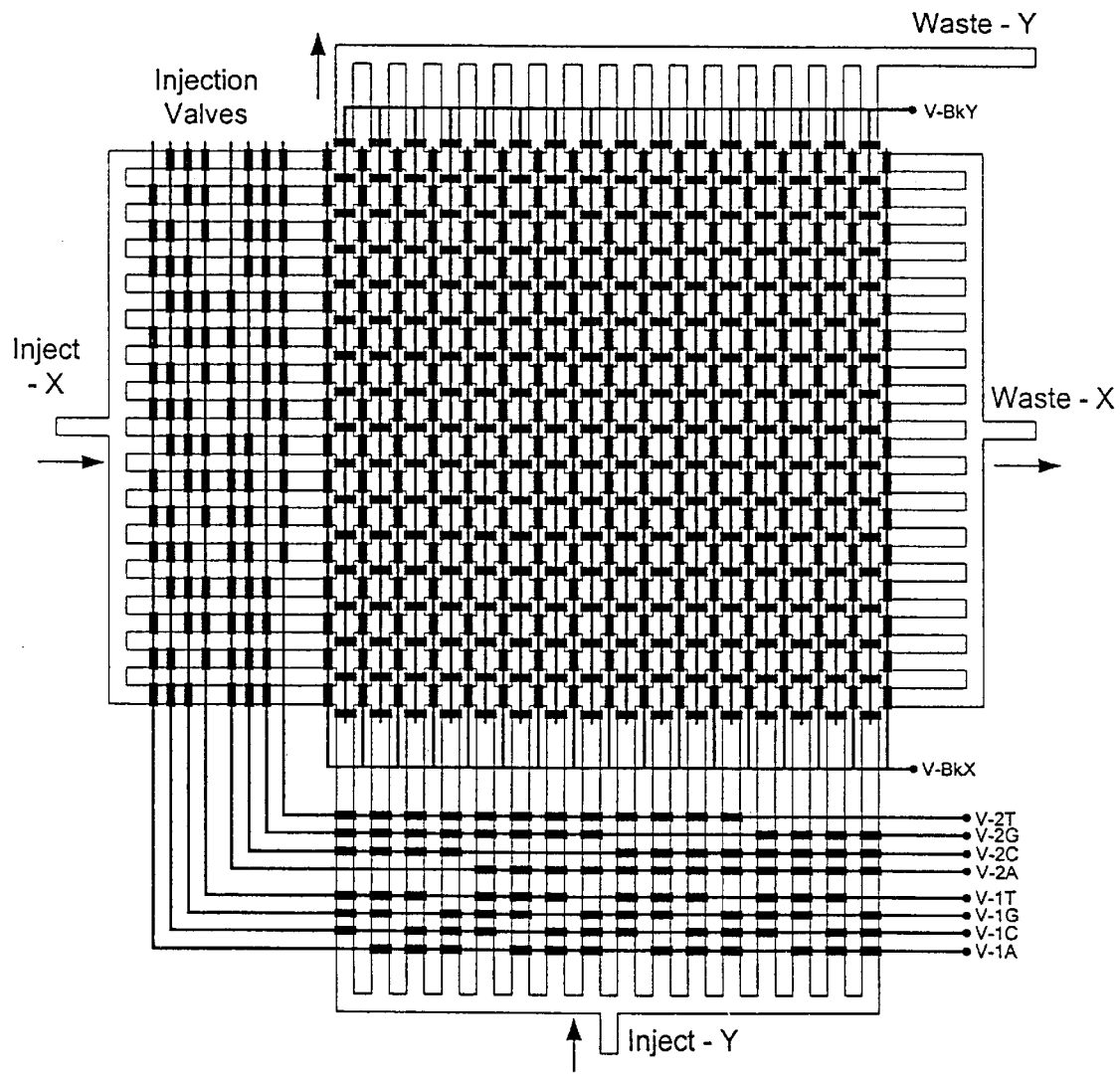
FIG. 18A is a schematic drawing of flow channels (grey) and pressure channels (black) including valves for a multi elastic layer chemical reaction apparatus of the present invention, the use of which is illustrated in Example 2.
Figure 18B:
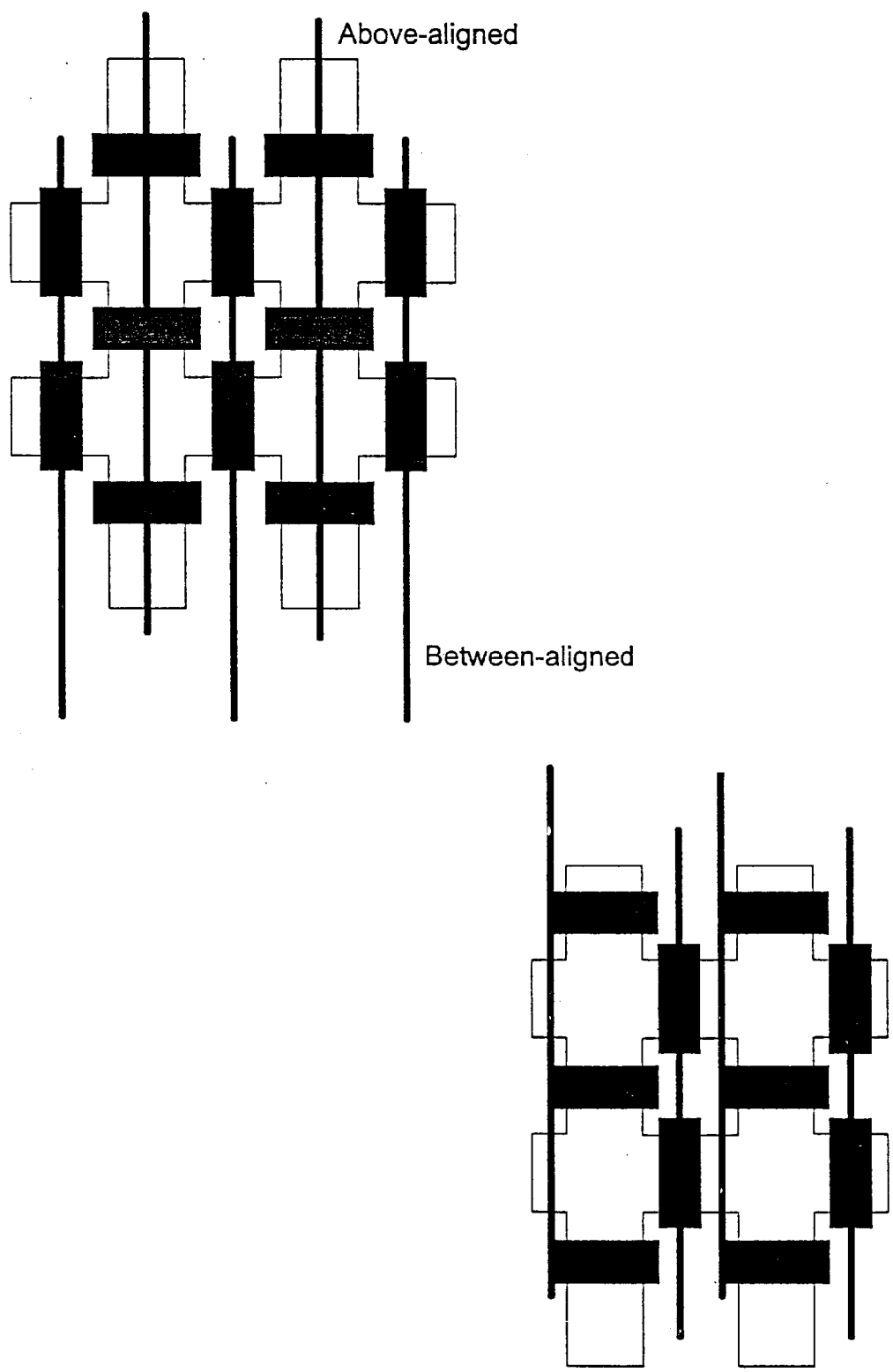
FIG. 18B is a close-up view of a section of FIG. 18A showing two variations of "above-aligned" and "between-aligned" pressure channels (black) relative to the flow channels (grey). In particular, it illustrates that the narrow parts of the "above-aligned" and "between-aligned" pressure channels can have any alignment, provided the wide sections are aligned above and between the flow channels, respectively.

The valve array design is shown in FIG. 18. The part in grey is the pattern that is used to make the mold for casting the bottom layer (i.e., the first elastic member) containing the flow channels. The part in black is the pattern from which a mold is made to cast the top layer (i.e., the second elastic member containing pressure channels) of the 2 layer elastic apparatus. Note that the way these have been superimposed in the image is similar what one would see, looking down through the device from the top through the two layers towards the solid support.

In this embodiment, no alignment marks are needed because there is no need to remove and reattach the elastic members. The fluid channels essentially consist of two sets of channels. One set of 16 channels flows in the X-direction from left to right (from Inject-X to Waste-X). The other set of 16 channels flows in the Y-direction from bottom to top (from Inject-Y to Waste-Y). In some cases, more valves at the outputs may be needed to ensure that we do not get fluid flow in the backwards direction. These details have been omitted for clarity.

If the set of pressure channels connected to V-BlkX (which are on top of the x-axis flow channels and are aligned in between y-axis flow channels) is pressurized, all the channels in the X-direction are blocked, leaving only the Y-direction channels open for flow of reagents. Similarly, if the set of pressure channels connected to V-BlkY (which are on top of the y-axis flow channels and are aligned in between x-axis flow channels) is pressurized, all the channels in the Y-direction are blocked leaving only the X-direction channels open for flow of reagents. As discussed above, the valves close the underlying fluid channels only when they are wide. The narrow sections of the pressure channels generally have no significant effect on the underlying fluid layer.

The remaining set of valves are called injection valves. They control which channels the injected fluid will enter. For clarity and simplicity of illustration, there is only one injection point for the X-direction channels and one for the Y-direction channels. This means that nucleic acids A, C, G, and T have to be introduced sequentially. However, it should be appreciated that reagents can be introduced simultaneously to different channels by having more injection valves, which may or may not be interconnected.

The two elastic members are attached to a clean derivatized solid support to provide a chemical reaction apparatus having flow channel and pressure channel configurations as shown in FIG. 18.

Step 1: First Flow of reagents in the X-direction channels

The "V-BlkY" pressure channel is activated (e.g., pressurized with air) to block the flow in the Y-direction and to allow the flow in the X-direction. Injection valve V-1A is activated (e.g., pressurized with air) to allow flow of a solution containing nucleic acid 'A' through channels (rows) 1, 5, 9 and 13, numbered from the top of FIG. 18, and to block the flow of solution in all other channels in the X-direction. A solution containing nucleic acid 'A' is introduced through Inject-X. The injected reagent exits at waste-X site. The channels are then flushed (i.e., washed) with a wash buffer by injecting the wash solution at Inject-X site.

Injection valve V-1A is deactivated (e.g., by depressurizing), and injection valve V-1C is activated to allow flow of a solution containing nucleic acid 'C' through channels (rows) 2, 6, 10 and 14, and to block the flow of solution in all other channels in the X-direction. The nucleic acid 'C' is then injected through Inject-X. The channels are then flushed with a wash buffer.

Injection valve V-1C is deactivated and injection valve V-1G is activated to allow flow of a solution containing nucleic acid 'G' through channels 3, 7, 11, and 15, and to block the flow of solution in all other channels in the X-direction. A solution containing nucleic acid 'G' is introduced through Inject-X. The channels are then flushed with a wash buffer.

Injection valve V-1G is deactivated and injection valve V-1T is activated to allow flow of a solution containing nucleic acid 'T' through channels 4, 8, 12, and 16, and to block the flow of solution in all other channels in the X-direction. A solution containing nucleic acid 'T' is introduced through Inject-X. The channels are then flushed with a wash buffer.

Figure 19A:
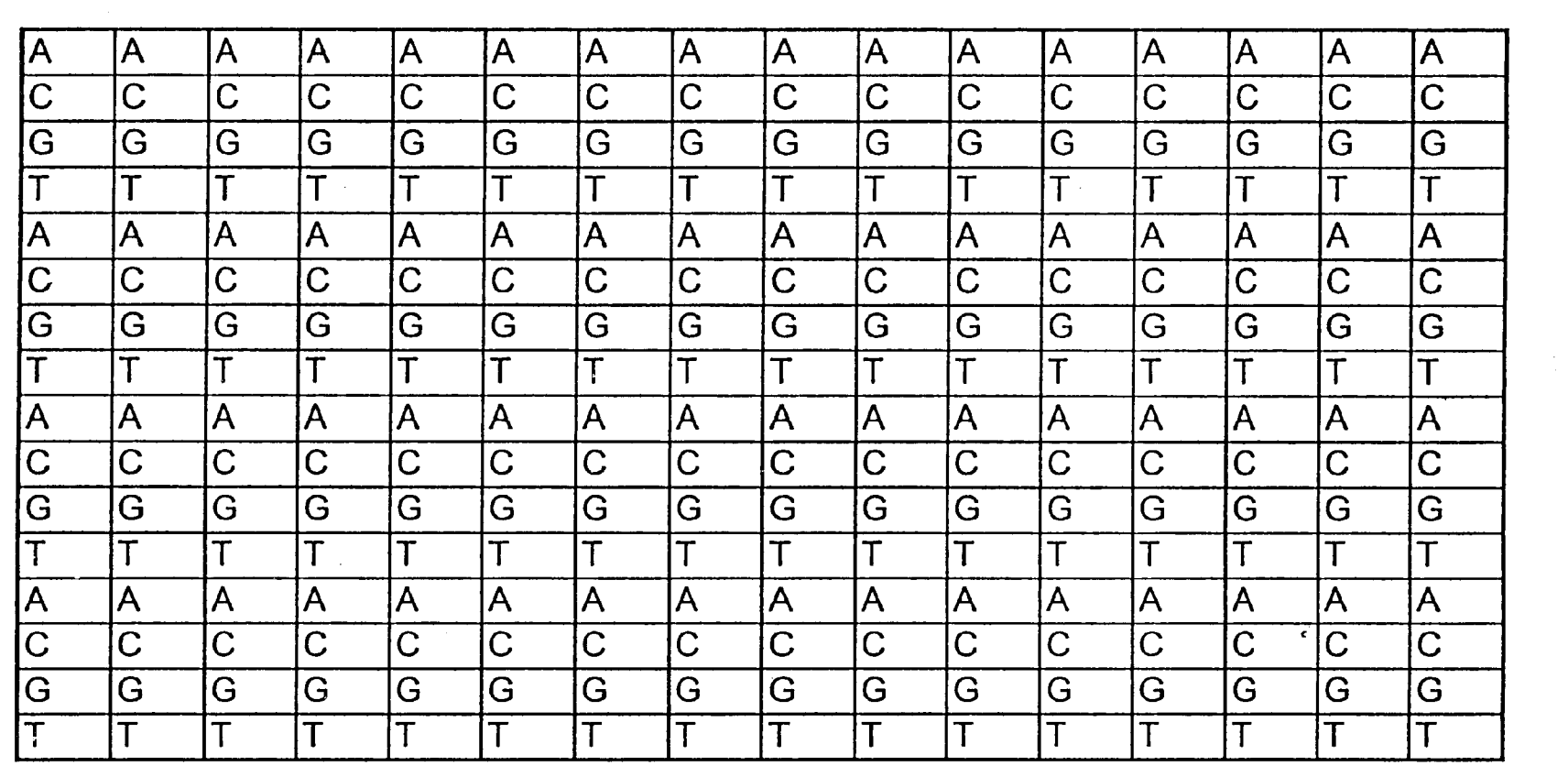

At this point, all 16 X-direction channels have been exposed to coupling reagent only once, i.e., the first base has been added to all 'rows' of the array. FIG. 19A illustrates the nucleotide array composition after Step 1.

Injection valve V-1T is deactivated and a capping reagent is injected through Inject-X to introduce the capping reagent through the entire set of channels in the X-direction. The channels are then flushed with a wash buffer, and an oxidizing reagent is introduced through Inject-X to allow flow of the oxidizing reagent through all the channels in the X-direction. The channels are flushed with a wash buffer, a deblocking reagent is introduced through Inject-X, and the channels are again flushed with a wash buffer.

Step 2: First Flow of reagents in the Y-direction channels

The "V-BlkY" pressure channel is deactivated and the "V-BlxX" pressure channel is activated (e.g., pressurized with air) to block the flow in the X-direction and to allow the flow in the Y-direction.

Injection valve V-1A is activated to allow flow of a solution containing nucleic acid 'A' through channels 1, 5, 9, and 13, numbered from the left, and to block the flow of solution in all other channels in the Y-direction. A solution containing nucleic acid 'A' is introduced through Inject-Y. The solution exits through Waste-Y. The channels are then flushed with a wash buffer.

Injection valve V-1A is deactivated and injection valve V-1C is activated to allow flow of a solution containing nucleic acid 'C' through channels 2, 6, 10 and 14, and to block the flow of solution in all other channels in the Y-direction. A solution containing nucleic acid 'C' is introduced through Inject-Y. The channels are then flushed with a wash buffer.

Injection valve V-1C is deactivated and injection valve V-1G is activated to allow flow of a solution containing nucleic acid 'G' through channels 3, 7, 11, and 15, and to block the flow of solution in all other channels in the Y-direction. A solution containing nucleic acid 'G' is introduced through Inject-Y. The channels are then flushed with a wash buffer.

Injection valve V-1G is deactivated and injection valve V-1T is activated to allow flow of a solution containing nucleic acid 'T' through channels 4, 8, 12, and 16, and to block the flow of solution in all other channels in the Y-direction. A solution containing nucleic acid 'T' is introduced through Inject-Y. The channels are then flushed with a wash buffer.

Injection valve V-1T is deactivated and a capping reagent is injected through Inject-Y to introduce the capping reagent through the entire channels in the Y-direction. The channels are then flushed with a wash buffer, and an oxidizing reagent is introduced through Inject-Y to allow flow of the oxidizing reagent through all the channels in the Y-direction. The channels are flushed with a wash buffer, a deblocking reagent is introduced through Inject-Y, and the channels are again flushed with a wash buffer.

Figure 19B:
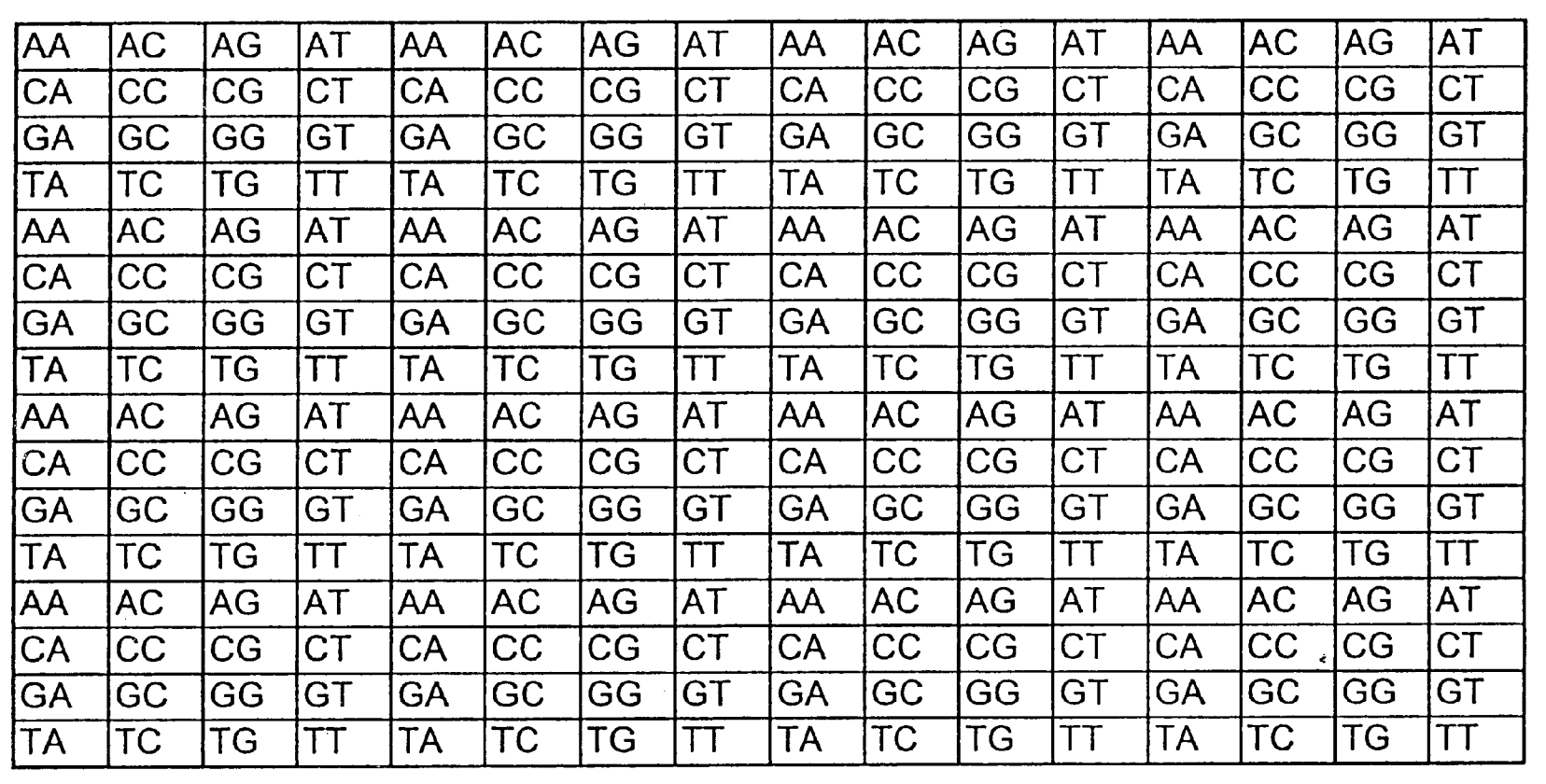

Step 2 adds a second base to all compounds on the array. The second base is the same for all compounds in a given column. FIG. 19B illustrates the nucleotide array composition after Step 2.

Step 3: Second Flow of reagents in the X-direction channels

The "V-BlkX" pressure channel is deactivated and the "V-BlkY" pressure channel is activated to block the flow in the Y-direction and to allow the flow in the X-direction. Injection valve V-2A is activated to allow flow of a solution containing nucleic acid 'A' through channels 1, 2, 3, and 4, and to block the flow of solution in all other channels in the X-direction. A solution containing nucleic acid 'A' is introduced through Inject-X. The injected reagent exits at the waste-X site. The channels are then flushed (i.e., washed) with a wash buffer by injecting the wash solution at Inject-X site.

Injection valve V-2A is deactivated, and injection valve V-2C is activated to allow flow of a solution containing nucleic acid 'C' through channels 5, 6, 7 and 8, and to block the flow of solution in all other channels in the X-direction. The nucleic acid 'C' is then injected through Inject-X. The channels are then flushed with a wash buffer.

Injection valve V-2C is deactivated and injection valve V-2G is activated to allow flow of a solution containing nucleic acid 'G' through channels 9, 10, 11, and 12, and to block the flow of solution in all other channels in the X-direction. A solution containing nucleic acid 'G' is introduced through Inject-X. The channels are then flushed with a wash buffer.

Injection valve V-2G is deactivated and injection valve V-2T is activated to allow flow of a solution containing nucleic acid 'T' through channels 13, 14, 15, and 16, and to block the flow of solution in all other channels in the X-direction. A solution containing nucleic acid 'T' is introduced through Inject-X. The channels are then flushed with a wash buffer.

Figure 19C:
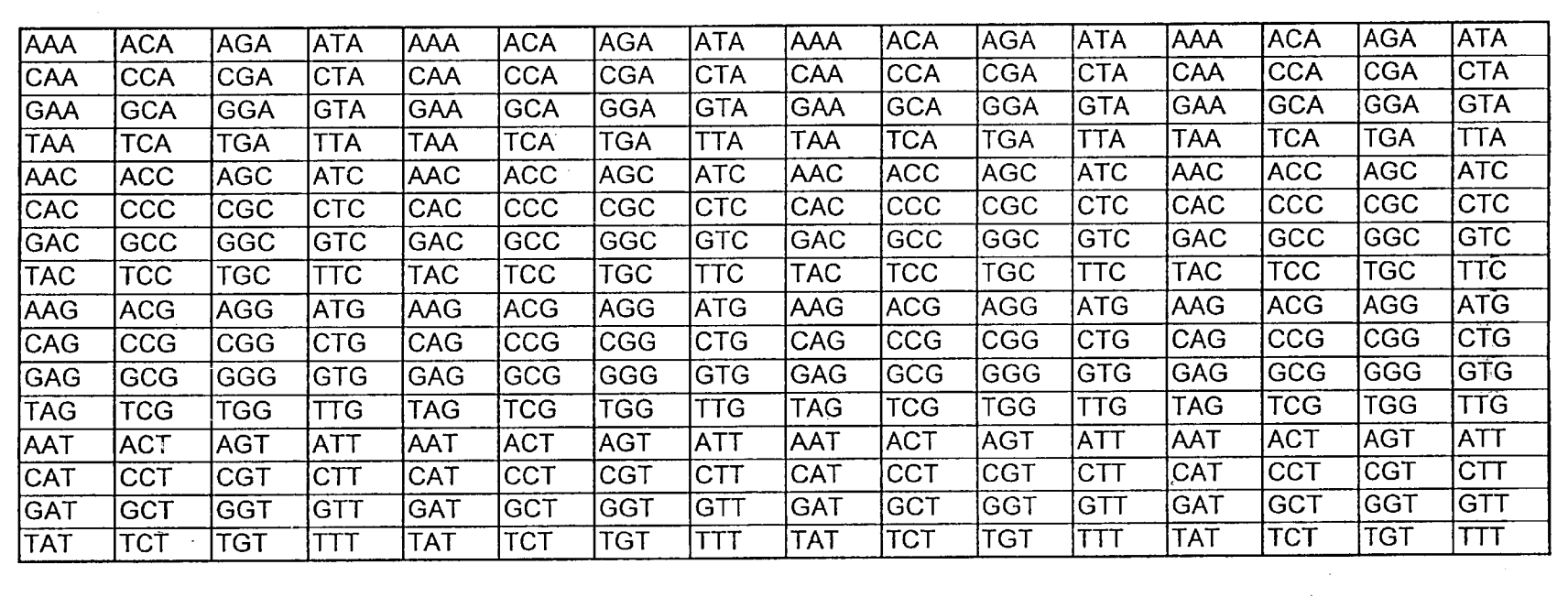

Step 3 adds a third base to all compounds on the array. The third base is the same for all compounds in a given row. FIG. 19C illustrates the nucleotide array composition after Step 3.

Injection valve V-2T is deactivated and a capping reagent is injected through Inject-X to introduce the capping reagent through the entire channels in the X-direction. The channels are then flushed with a wash buffer, and an oxidizing reagent is introduced through Inject-X to allow flow of the oxidizing reagent through all the channels in the X-direction. The channels are flushed with a wash buffer, a deblocking reagent is introduced through Inject-X, and the channels are again flushed with a wash buffer.

Step 4: Second Flow of reagents in the Y-direction channels

The "V-BlkY" pressure channel is deactivated and the "V-BlxX" pressure channel is activated to block the flow in the X-direction and to allow the flow in the Y-direction.

Injection valve V-2A is activated to allow flow of a solution containing nucleic acid 'A' through channels 1, 2, 3, and 4, and to block the flow of solution in all other channels in the Y-direction. A solution containing nucleic acid 'A' is introduced through Inject-Y. The solution exits through Waste-Y. The channels are then flushed with a wash buffer.

Injection valve V-2A is deactivated and injection valve V-2C is activated to allow flow of a solution containing nucleic acid 'C' through channels 5, 6, 7, and 8, and to block the flow of solution in all other channels in the Y-direction. A solution containing nucleic acid 'C' is introduced through Inject-Y. The channels are then flushed with a wash buffer.

Injection valve V-2C is deactivated and injection valve V-2G is activated to allow flow of a solution containing nucleic acid 'G' through channels 9, 10, 11, and 12, and to block the flow of solution in all other channels in the Y-direction. A solution containing nucleic acid 'G' is introduced through Inject-Y. The channels are then flushed with a wash buffer.

Injection valve V-2G is deactivated and injection valve V-2T is activated to allow flow of a solution containing nucleic acid 'T' through channels 13, 14, 15, and 16, and to block the flow of solution in all other channels in the Y-direction. A solution containing nucleic acid 'T' is introduced through Inject-Y. The channels are then flushed with a wash buffer.

Injection valve V-2T is deactivated and a capping reagent is injected through Inject-Y to introduce the capping reagent through the entire channels in the Y-direction. The channels are then flushed with a wash buffer, and an oxidizing reagent is introduced through Inject-Y to allow flow of the oxidizing reagent through all the channels in the Y-direction. The channels are flushed with a wash buffer, a deblocking reagent is introduced through Inject-Y, and the channels are again flushed with a wash buffer.

Step 4 adds a fourth base to all compounds on the array. The fourth base is the same for all compounds in a given column. FIG. 19D illustrates the nucleotide array composition after Step 4.

The elastic members are then removed from the solid support. A final deprotection step (e.g., ammonia deprotection) is performed on the whole solid support. The elastic members can be discarded, or reused to make an array on another solid support.

With the example injection valve arrangement shown in FIG. 18, a total of 4×N/2 injection valves are needed to make a complete library of an array of DNA N-mers. Alternatively, more complicated reaction sequences can be achieved by having a plurality of valves at the waste side which is designed to redirect the flow from selected channels back into other channels flowing in the reverse direction. In this manner, one can achieve a "serpentine" arrangement of flow channels similar to that described in Example 1.

Example 2 is described for a chemical apparatus of the present invention having only one injection point at each axis, i.e., Inject-X and Inject-Y. However, a chemical reaction apparatus having a more sophisticated injection system (e.g., having four separate inlets for nucleic acids A, C, G, T, and inlets for the other reagents) is also within the scope of the present invention.

While the present invention has been described herein with reference to particular embodiments thereof, a latitude of modification, various changes and substitutions are intended in the foregoing disclosure. It will be appreciated that in some instances some features of the invention will be employed without a corresponding use of other features without departing from the scope of the invention as set forth herein. Therefore, many modifications may be made to adapt a particular situation or material to the teachings of the invention without departing from the essential scope and spirit of the present invention. It is intended that the invention not be limited to the particular embodiment disclosed as the best mode contemplated for carrying out this invention, but that the invention shall include all embodiments and equivalents falling within the scope of the appended claims.

What is claimed is:

1. A chemical reaction apparatus for synthesizing compounds, said reaction apparatus comprising a solid support base, a first elastic member interconnected to said solid support base, a first plurality of flow channels between said solid support base and said first elastic member, a second elastic member interconnected to said first elastic member, a plurality of pressure channels between said first elastic member and said second elastic member, and an elastomeric film that is disposed in between said flow channel and said pressure channel to regulate fluid flow through said flow channel, wherein said elastomeric film is deflectable into said flow channel in response to an actuation force applied to said pressure channel, said elastomeric film when positioned in said flow channel restricting fluid flow therethrough, wherein said solid support base comprises a functional group within at least a portion of said first plurality of flow channels for attaching compounds thereto.

2. The chemical reaction apparatus of claim 1, wherein said first elastic member is removably attached to said solid support base.

3. The chemical reaction apparatus of claim 1, wherein each of said first flow channels is substantially parallel to each other.

4. The chemical reaction apparatus of claim 1 further comprising a second plurality of flow channels between said first elastic member and said solid support base.

5. The chemical reaction apparatus of claim 4, wherein said second plurality of flow channels are substantially perpendicular to said first plurality of flow channels.

6. The chemical reaction apparatus of claim 1, wherein said plurality of pressure channels are substantially parallel to said first plurality of flow channels.

7. The chemical reaction apparatus of claim 6, wherein at least a portion of said plurality of pressure channels are aligned in between said first plurality of flow channels.

8. The chemical reaction apparatus of claim 7, wherein at least a portion of said plurality of pressure channels are aligned on top of said first plurality of flow channels.

9. The chemical reaction apparatus of claim 8, wherein said plurality of pressure channels aligned on top of said first plurality of flow channels comprise a varying channel widths within each pressure channels.

10. The chemical reaction apparatus of claim 1, wherein the cross-section of said channels are substantially arcuate.

11. The chemical reaction apparatus of claim 1, wherein said solid support base is selected from the group consisting of glass, polystyrene, polystyrene-divinylbenzene copolymer, silicone rubber, quartz, latex, polyurethane, gold and other derivatizable transition metals, silicon dioxide, silicon nitride, gallium arsenide, and the like.

12. The chemical reaction apparatus of claim 11, wherein said first elastic member is selected from the group consisting of polyacrylates, polyisoprene, polybutadiene, polychloroprene, polyisobutylene, poly(styrene-butadiene-styrene), polyurethanes, silicone rubbers, poly(bis(fluoroalkoxy)phosphazene), poly(carboranesiloxanes), poly(acrylonitrile-butadiene), poly(1-butene), poly(chlorotrifluoroethylenevinylidene fluoride) copolymers, poly(ethyl vinyl ether), poly(vinylidene fluoride), poly(vinylidene fluoride-hexafluoropropylene) copolymer, polyvinylchloride, polysulfone, polycarbonate, polymethacrylates, and fluoroelatomers.

13. The chemical reaction apparatus of claim 1, wherein said functional group provides covalent linkage between said solid support base and compounds.

14. The chemical reaction apparatus of claim 1, wherein said solid support further comprises a linker interconnected to said functional group, and wherein said linker further comprises a linking group for attaching compounds thereto.

15. The chemical reaction apparatus of claim 1, wherein the interior of said flow channels comprise chemical resistant coating.

16. A chemical reaction apparatus for synthesizing compounds, said chemical reaction apparatus comprising:
    (a) a solid support base;
    (b) a first elastic member attached to said solid support base;
    (c) a first plurality of flow channels between said solid support base and said elastic member;
    (d) a second elastic member attached to said first elastic member;
    (e) a plurality of pressure channels between said first elastic member and said second elastic member; and
    (f) an elastomeric segment disposed in between said flow channel and said pressure channel to regulate fluid flow through said flow channel,
        wherein said solid support base comprises a functional group within at least a portion of said first plurality of flow channel for attaching compounds thereto.

17. The chemical reaction apparatus of claim 16, wherein said first plurality of flow channels are substantially parallel to each other.

18. The chemical reaction apparatus of claim 16, wherein said plurality of pressure channels are substantially parallel to said first plurality of flow channels.

19. The chemical reaction apparatus of claim 18, wherein at least a portion of said plurality of pressure channels are aligned in between said first plurality of flow channels.

20. The chemical reaction apparatus of claim 19, wherein at least a portion of said plurality of pressure channels are aligned on top of said first plurality of flow channels.

21. The chemical reaction apparatus of claim 20, wherein said plurality of pressure channels aligned on top of said first plurality of flow channels comprise a varying channel widths within each pressure channels.

22. The chemical reaction apparatus of claim 16, wherein the cross-section of said channels are curved.

23. The chemical reaction apparatus of claim 16, wherein said solid support base is selected from the group consisting of glass, polystyrene, polystyrene-divinylbenzene copolymer, silicone rubber, quartz, latex, polyurethane, gold and other derivatizable transition metals, silicon dioxide, silicon nitride, gallium arsenide, and the like.

24. The chemical reaction apparatus of claim 16, further comprising a second plurality of flow channels between said first elastic member and said solid support base.

25. The chemical reaction apparatus of claim 24, wherein said second plurality of flow channels are substantially perpendicular to said first plurality of flow channels.

26. The chemical reaction apparatus of claim 16, wherein each of said first elastic member and said second elastic member comprise a first component and a second component.

27. The chemical reaction apparatus of claim 26, wherein said first elastic member comprises excess of said first component and said second elastic member comprises excess said second component.

28. The chemical reaction apparatus of claim 16, wherein each of said first elastic member and said second elastic member is independently selected from the group consisting of polyacrylates, polyisoprene, polybutadiene, polychloroprene, polyisobutylene, poly(styrene-butadiene-styrene), polyurethanes, silicone rubbers, poly(bis(fluoroalkoxy)phosphazene), poly(carborane-siloxanes), poly(acrylonitrile-butadiene), poly(1-butene), poly(chlorotrifluoroethylene-vinylidene fluoride) copolymers, poly(ethyl vinyl ether), poly(vinylidene fluoride), poly(vinylidene fluoride-hexafluoropropylene) copolymer, polyvinylchloride, polysulfone, polycarbonate, polymethacrylates, and fluoroelatomers.

29. The chemical reaction apparatus of claim 16, wherein said functional group provides covalent linkage between said solid support base and said compounds.

30. The chemical reaction apparatus of claim 16, wherein said solid support further comprises a linker interconnected to said functional group, and wherein said linker further comprises a linking group for attaching said compounds thereto.

31. The chemical reaction apparatus of claim 16, further comprising an elastomeric segment that is disposed in between said flow channel and said pressure channel, wherein said elastomeric segment is deflectable into said flow channel in response to an actuation force applied to said pressure channel, said elastomeric segment when positioned in said flow channel restricting fluid flow therethrough.

32. A method for synthesizing a plurality of compounds comprising the steps of:
   (a) pressurizing a chemical reaction apparatus, wherein said chemical apparatus comprises:
      (i) a solid support base;
      (ii) a first elastic member attached to said solid support base;
      (iii) a first.plurality of flow channels and a second plurality of flow channels between the interface of said solid support base and said first elastic member, wherein said first plurality of flow channels intersects said second plurality of flow channels, and wherein at least a portion of said solid support base within the intersections of said first plurality of flow channels and said second plurality of flow channels comprises a functional group for attaching compounds thereto;
      (iv) a second elastic member interconnected to said first elastic member;
      (v) a first plurality of pressure channels between said first elastic member and said second elastic member, wherein said first plurality of pressure channels are aligned in between said first plurality of flow channels, and wherein said first plurality of pressure channels are capable of sealing at least a portion of said second plurality of flow channels when said first plurality of pressure channels are pressurized; and
      (vi) a second plurality of pressure channels between said first elastic member and said second elastic member, wherein said second plurality of pressure channels are capable of sealing at least a portion of said first plurality of flow channels when at least a portion of said second plurality of pressure channels are pressurized,
         wherein said first plurality of pressure channels are pressurized to seal at least a portion of said second plurality of flow channels;
   (b) adding a set of compounds to said first plurality of flow channels, whereby at least a portion of said set of compounds are attached to said solid support base to produce a solid-support bound compounds;
   (c) removing substantially all non-attached compounds from said first plurality of flow channels;
   (d) pressurizing said second plurality of pressure channels to seal at least a portion of said first plurality of flow channels;
   (e) adding another set of compounds to said second plurality of flow channels, whereby at least a portion of said set of compounds are attached to said solid-support bound compounds; and
   (f) removing substantially all non-attached compounds from said second plurality of flow channels.

33. The method of claim 32, wherein said first plurality of flow channels and said second plurality of flow channels are substantially perpendicular.

34. The method of claim 32 further comprising repeating said steps (a) to (c), said steps (d) to (f), or combinations thereof.

35. The method of claim 32, wherein said set of compounds comprises at least two different compounds.

36. The method of claim 35, wherein only one compound from said set of compounds is introduced to each of said first plurality of flow channels.

37. The method of claim 32, wherein said another set of compounds comprises at least two different compounds.

38. The method of claim 37, wherein only one compound from said another set of compounds is introduced to each of said second plurality of flow channels.

39. The method of claim 32, wherein said set of compounds is introduced by injection of a set of solutions comprising said compounds, wherein each solution comprises only one compound from said set of compounds.

* * * * *

UNITED STATES PATENT AND TRADEMARK OFFICE
CERTIFICATE OF CORRECTION

| | | |
|---|---|---|
| PATENT NO. | : 6,508,988 B1 | Page 1 of 1 |
| APPLICATION NO. | : 09/679432 | |
| DATED | : January 21, 2003 | |
| INVENTOR(S) | : R. Michael Van Dam et al. | |

It is certified that error appears in the above-identified patent and that said Letters Patent is hereby corrected as shown below:

Column 1, lines 6-10, delete "The U.S. Government has a paid-up license in this invention and the right in limited circumstances to require the patent owner to license others on reasonable terms as provided for by the terms of Grant No. HG-01642-02, awarded by the National Institute of Health." and insert --This invention was made with government support under Grant No. HG-01642-02 awarded by the National Institute of Health. The government has certain rights in the invention.--

Signed and Sealed this

Fourteenth Day of April, 2009

JOHN DOLL
*Acting Director of the United States Patent and Trademark Office*